US006676339B2

(12) United States Patent
Hartlöhner

(10) Patent No.: US 6,676,339 B2
(45) Date of Patent: Jan. 13, 2004

(54) INDEXABLE CUTTING INSERT FOR MACHINING WORKPIECES

(75) Inventor: Rudi Hartlöhner, Tuchenbach (DE)

(73) Assignee: Kennametal Inc., Latrobe, PA (US)

(*) Notice: Subject to any disclaimer, the term of this patent is extended or adjusted under 35 U.S.C. 154(b) by 53 days.

(21) Appl. No.: 10/008,528

(22) Filed: Nov. 5, 2001

(65) Prior Publication Data

US 2002/0136611 A1 Sep. 26, 2002

Related U.S. Application Data

(63) Continuation-in-part of application No. PCT/EP00/03881, filed on Apr. 28, 2000.

(30) Foreign Application Priority Data

May 3, 1999 (DE) ........................................ 199 20 192

(51) Int. Cl.[7] .......................... B23B 27/22; B23P 15/28
(52) U.S. Cl. ....................................... 407/114; 407/116
(58) Field of Search .......................... 407/18, 114, 115, 407/116

(56) References Cited

U.S. PATENT DOCUMENTS

| | | | | | |
|---|---|---|---|---|---|
| 3,800,379 A | * | 4/1974 | Hopkins | 407/114 |
| 3,815,191 A | | 6/1974 | Holma | |
| 3,975,809 A | | 8/1976 | Sorice et al. | |
| 4,214,847 A | | 7/1980 | Kraemer | |
| 4,273,480 A | * | 6/1981 | Shirai et al. | 407/114 |
| 4,988,242 A | * | 1/1991 | Pettersson et al. | 407/114 |
| 5,044,839 A | * | 9/1991 | Takahashi | 407/114 |
| 5,067,858 A | * | 11/1991 | Cook | 407/114 |
| 5,743,681 A | * | 4/1998 | Wiman et al. | 407/114 |
| 5,810,520 A | * | 9/1998 | Hintze et al. | 407/114 |
| 5,876,154 A | | 3/1999 | Enderle | |
| 5,921,722 A | * | 7/1999 | Paya et al. | 407/114 |
| 5,967,710 A | * | 10/1999 | Krenzer | 407/114 |
| 6,186,705 B1 | * | 2/2001 | Kumar et al. | 407/114 |
| 6,241,430 B1 | * | 6/2001 | Norstrom | 407/114 |
| 2002/0071729 A1 | * | 6/2002 | Middlemiss et al. | 407/114 |

FOREIGN PATENT DOCUMENTS

| | | |
|---|---|---|
| DE | 2545769 | 4/1977 |
| DE | 3613281 | 10/1986 |
| DE | 4134335 | 4/1993 |
| EP | 0422586 | 4/1991 |
| WO | 9712711 | 4/1997 |

* cited by examiner

*Primary Examiner*—Daniel W. Howell
*Assistant Examiner*—Brian D. Walsh
(74) *Attorney, Agent, or Firm*—Nils H. Ljungman & Associates

(57) ABSTRACT

The invention relates to a cutter insert comprising cutting edges (3, 6) and at least one cutting cavity (4) which is recessed in the cutting surface (1). The surface and the contour shape of the cutting cavity (4) are configured such that they are similar to the surface and to the contour shape of an asymmetrically oval shell. The cross-sectional profile of the cutting cavity surface comprises, in the directions of the principal axis (8) and the minor axis (10) of the oval shape, a less sharp or sharper curvature on the sides thereof facing the cutting tip (2) and the cutting edge (3, 6) than that on the sides thereof facing away from the cutting tip (2) and the cutting edge (3, 6).

20 Claims, 19 Drawing Sheets

FIG. 9
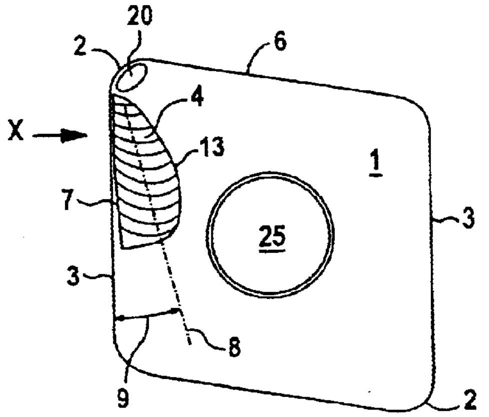
FIG. 10
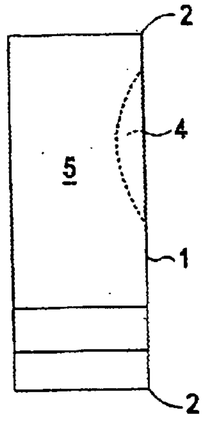
FIG. 11
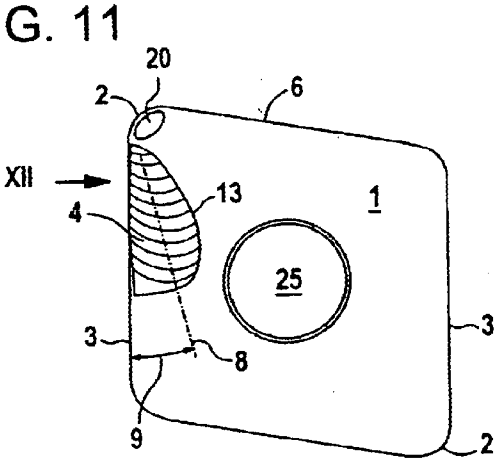
FIG. 12
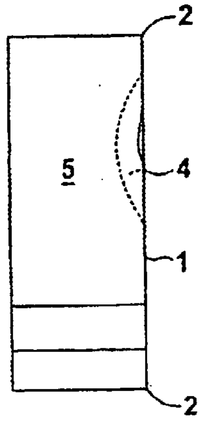
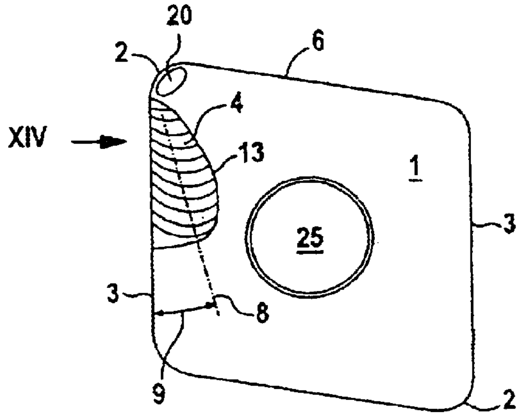
FIG. 13
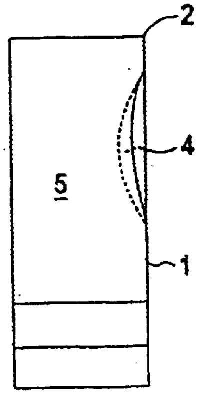
FIG. 14

FIG. 15
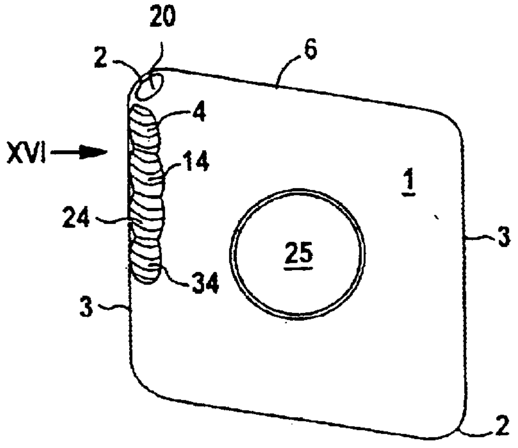
FIG. 16
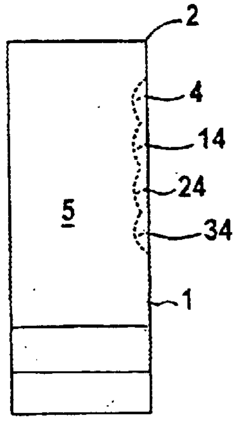
FIG. 17
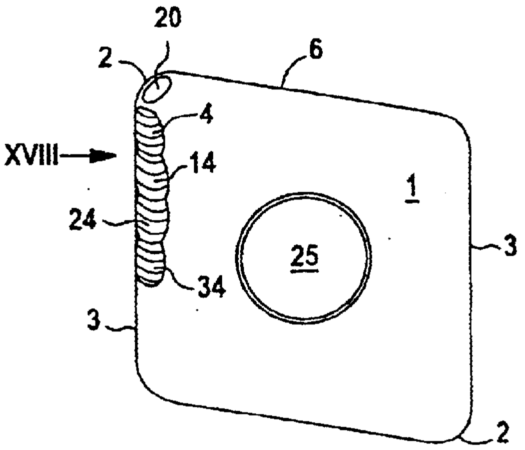
FIG. 18
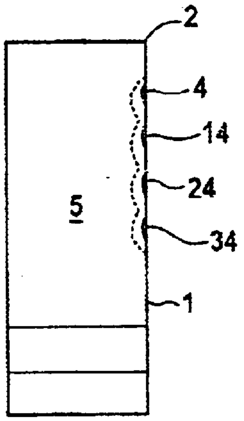
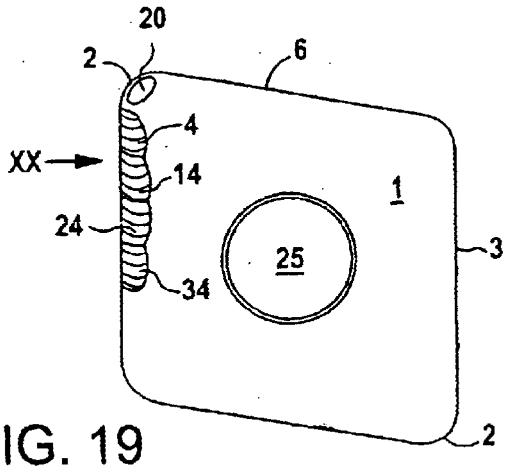
FIG. 19
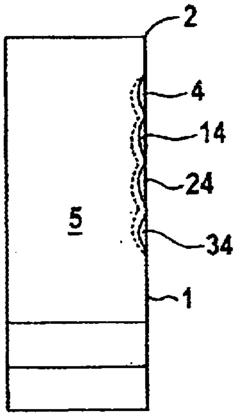
FIG. 20

FIG. 21
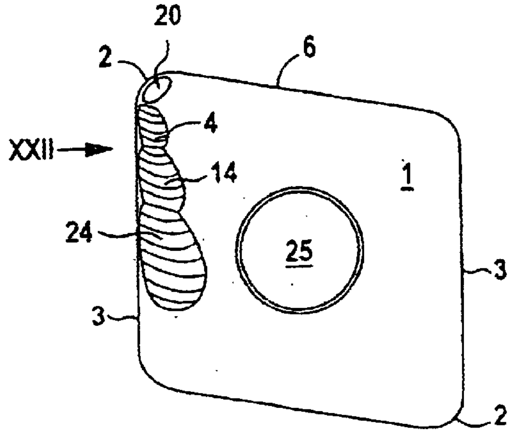
FIG. 22
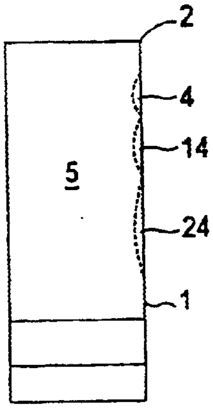
FIG. 23
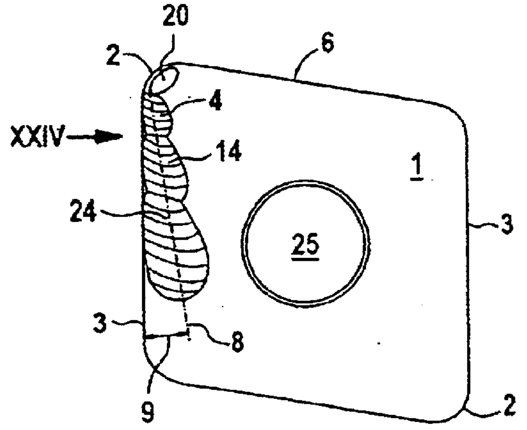
FIG. 24
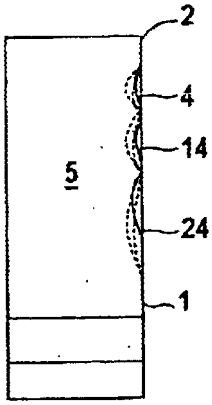
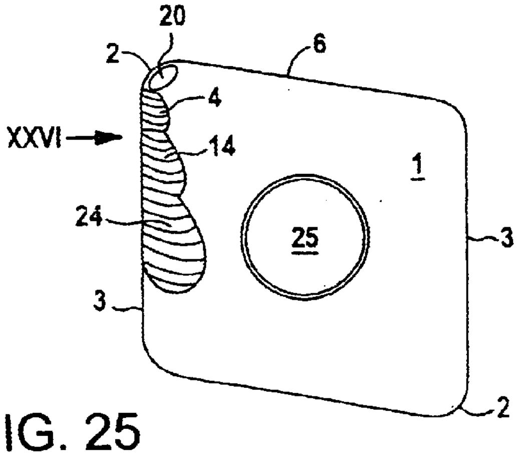
FIG. 25
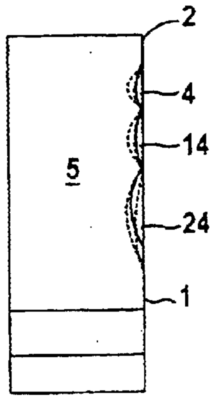
FIG. 26

INDEXABLE CUTTING INSERT FOR MACHINING WORKPIECES

CONTINUING APPLICATION DATA

This application is a Continuation-In-Part application of International Patent Application No. PCT/EP00/03881, filed on Apr. 28, 2000, which claims priority from Federal Republic of Germany Patent Application No. 199 20 192.7, filed on May 3, 1999. International Patent Application No. PCT/EP00/03881 was pending as of the filing date of this application. The United States was an elected state in International Patent Application No. PCT/EP00/03881.

BACKGROUND OF THE INVENTION

1. Field of the Invention

The invention relates to a cutting insert, in particular an indexable insert for cutting metal workpieces, with a cover surface, a cutting edge and a chip flute adjacent to the cutting edge made in the face of the cutting edge to form and guide the chip that is discharged. Such cutting inserts are mounted interchangeably on tool holders. The basic shape of conventional cutting inserts of this type has two opposite cover surfaces that are parallel to each other with a polygon-shaped peripheral wall between them. The cutting edges are formed by the transition edges between the respective cover surfaces positioned at the top and the flat areas of the peripheral wall of the insert. Two transition edges meeting at an angle form a rounded cutting tip where they join. Thus, the cutting inserts have an essentially triangular, quadrangular, rhombic or otherwise polygonal contour. This makes it possible to provide the cutting inserts with a plurality of cutting edges or cutting tips that can be brought into their engagement position one after the other on a holder. Such cutting inserts are referred to as indexable inserts. They make possible better utilization of the quantity of material required for the cutting insert and thus provide cost savings.

2. Background Information

The cover surface, which is on top when the cutting insert is clamped onto the holder and comes into contact with the chip during the cutting process, comprises or is the face of the cutting edge that is adjacent to it. The side faces of the cutting insert form the flanks of the cutting edges that delimit them toward the cutting side in the operating position. During the cutting process, the flank of a cutting edge with its respective surface faces the workpiece to be machined. The surface of the workpiece being machined passes along the flank of the major or minor cutting edge of the cutter cutting tip which is in the cutting engagement position in the direction facing away from the cutting edges at an angle that forms the clearance angle. Typical cutting inserts of this type are known, for example, from U.S. Pat. Nos. 4,880,338, 4,335,984, 4,988,242 and 4,215,957, which are incorporated by reference herein.

The geometry of the cutting edges of such cutting inserts is determined by the desire to minimize the energy required for the cutting process. The energy is determined by the geometry of the chips generated, and their geometry depends on the geometry of the cutting inserts or their cutting edges. Also important for chip formation are the cutting speed, the feed, and the depth of cut. The faces are frequently provided with flutes in the areas flanking the cutting edges to control chip flow and to influence the shape of the chips as they are removed and flow away from the workpiece. The invention relates to the shape of such chip flutes flanking a cutting edge which are formed in at least one face of such a cutting insert.

It is considered advantageous if the chip removed by the cutting edge, viewed crosswise to its direction of flow, is asymmetrically concave, is curved in an oval shape, and if this chip, viewed in its longitudinal direction, i.e. in the direction of the chip flow directed away from the cutting edge, comprises scales, as it were, which are fitted together in the direction of the chip flow. This structure facilitates chip breakage and also helps to achieve the objective of the configuration of the cutting insert according to the invention.

OBJECT OF THE INVENTION

Thus, the object of the invention is to design the initially mentioned cutting insert such that it ensures an advantageous cutting process or chip removal. This object is achieved in a cutting insert, particularly an indexable insert for removing chips during the machining of metal workpieces. The cutting insert has at least one cutting edge and at least one chip flute flanking the cutting edge made in the face to shape and guide the chip that has been separated and is being removed from the workpiece. The surface of the chip flute is realized similar to the surface of an asymmetrical oval hollowed-out shell, whereby the asymmetry of the oval curved shape of a profile cross section of the shell surface comprises a profile cross section in the direction of the major axis and minor axis that has a curvature which is less pronounced on its side facing the cutting tip and the cutting edge than on its side facing away from the cutting tip and the cutting edge. The term “oval” is derived from the Latin word “ovum” meaning egg. It describes a closed flat curve with positive curvature throughout, which as a rule has four vertices. The oval can thus be defined loosely as an ellipse (a. Brockhaus Encyclopedia, Vol. 24-19th Edition, 1991).

SUMMARY OF THE INVENTION

The embodiment of a chip flute according to the invention and its correspondence with the geometry of the cutting insert have the effect that the chip does not run off essentially perpendicular to the cutting edge, particularly to the major cutting edge, but is deflected away from the cutting edge at an acute angle, the angle sides of which diverge in the direction facing away from the cutting tip. The cutting tip is the part of the cutting tool that is closest to the workpiece during the cutting process. If the chip flow direction is influenced in such a way that it points away from the workpiece, if possible as soon as when the chip is created, the workpiece is optimally protected from damaging effects. On the other hand, a chip that normally strikes a straight or symmetrically curved cutting edge moves away from the cutting edge approximately perpendicular to the cutting edge, and that is what this invention aims to prevent. The cutting insert geometry responsible for this effect has also an advantageous effect on the speed with which the chip is removed. In the narrower area taught by the invention facing the cutting tip, the chip flow is more severely restricted than in the area facing away from the cutting tip, in which the chip flute is wider.

Whether the cross-sectional profile of the chip flute surface has a greater or lesser curvature in the respective directions of the major and minor axis of the oval shape on its side facing the cutting tip and the cutting edge, compared to the side facing away from the cutting tip, essentially depends on the material. The more pronounced curvature is particularly suitable for a hard material and the less pronounced curvature for a soft material.

According to a further development of the invention, the chip flutes designed according to the invention can be spaced at a varying distance from the associated cutting edge. Different positions are disclosed in the embodiments of the invention discussed herein below.

Advantageously, a plurality of chip flutes thus formed may be arranged end-to-end along the cutting edge like a strand of pearls. If these chip flutes are sized identically and arranged parallel to the cutting edge as discussed in the embodiments of the invention herein below, the chip is given a corrugated profile, the corrugations of which are asymmetrical and thus cause a flow away from the cutting tip. If, as disclosed in the embodiments of the invention discussed herein below, the chip flutes increase in size with increasing distance from the cutting tip, the above effect on the chip shape is significantly enhanced. Finally, at least one of the embodiments of the invention discussed herein below comprises a further development in that it places an additional central flute in the area of the cutting tip.

The asymmetry discussed above in relation to the perimeter edge of the chip flute may be further defined, in at least one possible embodiment of the present invention, by different radii of curvature of sections of the perimeter, which radii of curvature are different from or not equal to corresponding radii of curvature which may be located on an opposite side of the perimeter edge. For example, the radius of curvature of a first section of the perimeter that is immediately adjacent the cutting tip may be different from a second corresponding section disposed opposite the first section on the side of the perimeter disposed furthest from the cutting tip. Also, the radius of curvature of a third section of the perimeter that is immediately adjacent a cutting edge may be different from a fourth corresponding section disposed opposite the second section on the side of the perimeter disposed away from the cutting edge. Therefore, different radii of curvature of various sections of the perimeter edge will produce the asymmetry of one side or section with respect to an opposing or corresponding side or section.

In addition, the asymmetry may be further defined by the bisection, either lengthwise or widthwise, of the essentially oval-shaped chip flute. For example, a bisection line could be drawn along the length of the flute from two points which are the two points furthest apart from each other at opposite ends of the chip flute. The two halves produced by the bisection of the chip flute, in an asymmetrical arrangement, would not be mirror images of each other. One half could have a different curvature and/or perimeter length from the other. Further, in at least one embodiment, substantial portions of opposing sides would have a different curvature and/or perimeter length from each other to produce a substantial asymmetry with respect to each other. On the contrary, symmetrical halves would be essentially mirror images of each other. A similar line of bisection across the width and essentially perpendicular to the bisecting line of the length could also produce halves that are asymmetrical in that they are not mirror images of one another.

In a further possible embodiment according to the present invention, the cutting insert has two chip flutes located adjacent the cutting edges, which chip flutes are similar to each other. To further explain, the two chip flutes may have essentially identical perimeter edges. The chip flutes may also have similar depression surfaces in shape, slope, and/or depth. In another embodiment, the chip flutes may also be different in any one of the above features.

In at least one possible embodiment of the present invention, the essentially oval-shaped edge surrounding the perimeter of the chip flute may be substantially symmetrical, while the depth of the depression may be asymmetrical. To further explain, the deepest point of the chip flute may not be located in the geometric center of the depression; that is, the deepest point in the depression is located away from the geometric center of the depression and nearer to a point or area on the perimeter edge of the chip flute. Therefore, the slope of the surface of depression on the side nearest the cutting tip, for example, may be less than the slope of the surface of the depression on the opposite side furthest away from the cutting tip. The deepest point is the same distance in depth from any and all points on the perimeter edge of the chip flute, but is not the same distance in point-to-point length from all points along the perimeter edge of the chip flute. The deepest point may be located at any point on the surface of the depression within the depression.

In another possible embodiment according to the present invention, there may be several depressions or chip flutes that are connected together in a string or cascading arrangement. Each of the individual depressions may have any of the characteristics of the solitary depressions discussed above. The depressions may be connected by narrow plateaus or ridges, which are areas where the upwardly sloping sides of two adjacent depressions meet. These ridges may be of different shapes. In at least one possible embodiment of the present invention, the ridges may be curved such that the inside of the curve faces away from the cutting tip. Other configurations may have the inside of the curve facing toward the cutting tip. Still another variation might combine the two into an S-shaped curve.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is described in further detail by means of the exemplary cutting inserts depicted in the accompanying figures, in which:

FIG. 9 is a top view of a cutting insert, which for the sake of clarity shows only a single chip flute as claimed by the invention;

FIG. 10 is a side view of the cutting insert in the direction of arrow X in FIG. 9 with a plan view from overhead of the flank of the cutting edge and only a suggestion of the chip flute, which cannot be seen from the flank side;

FIG. 11 is a plan view from overhead of a modified embodiment as illustrated in FIG. 9 in which the chip flute is moved closer to the cutting edge such that with a central area of its longitudinal side facing toward the cutting edge it terminates in the flank of the cutting edge;

FIG. 12 is a side view in the direction of arrow XII of the cutting insert, i.e. a plan view from overhead of its face;

FIGS. 13 and 14 are views analogous to FIGS. 9 and 10 or 11 and 12 respectively, in which the chip flute with its entire longitudinal side facing toward the cutting edge terminates in the flank of the cutting edge;

FIG. 15 is a plan view from overhead of a modification of the embodiment illustrated in FIG. 9 such that in the longitudinal direction of the cutting edge, several but small chip flutes are arranged end-to-end like a strand of pearls in longitudinal direction of the cutting edge;

FIG. 16 is a side view analogous to the side views shown in FIGS. 10, 12 and 14 with a plan view from overhead of the flanks of the cutting edge in viewing direction of Arrow XVI in FIG. 15;

FIG. 17 is a plan view from overhead of a modified embodiment similar to FIG. 15 in which the end-to-and chip flutes, with a central area of their longitudinal sides facing toward the cutting edge, terminate in the flank of the cutting edge;

FIG. 18 is a plan view from overhead of the face corresponding to arrow XVIII in FIG. 17;

FIG. 19 is an embodiment similar to FIGS. 15 and 17 further modified such that the end-to-end chip flutes, with their entire longitudinal sides facing toward the cutting edge, terminate in the cutting edge flanks;

FIG. 20 is a side view of the face in the direction of arrow XX in FIG. 19;

FIG. 21 is a plan view from overhead of an embodiment similar to the one illustrated in FIG. 15 but further modified such that the size of the end-to-end chip flutes increases with increasing distance from the cutting tip;

FIG. 22 is a side view of the face corresponding to the viewing direction XXII in FIG. 21;

FIG. 23 is a modified embodiment similar to the one illustrated in FIG. 21 but such that the end-to-end chip flutes, with a central area of their longitudinal sides facing toward the cutting edge, terminate in the flank of the cutting edge;

FIG. 24 is a side view of the flank corresponding to arrow XXIV in FIG. 23;

FIG. 25 is an embodiment similar to the one illustrated in FIGS. 21 and 23 further modified in that the end-to-end chip flutes, which increase in size with increasing distance from the cutting tip, terminate in the flank of the cutting edge with their longitudinal sides;

FIG. 26 is a side view of the face in the direction of arrow XXVI in FIG. 25;

DESCRIPTION OF THE PREFERRED EMBODIMENT

Figure 1:
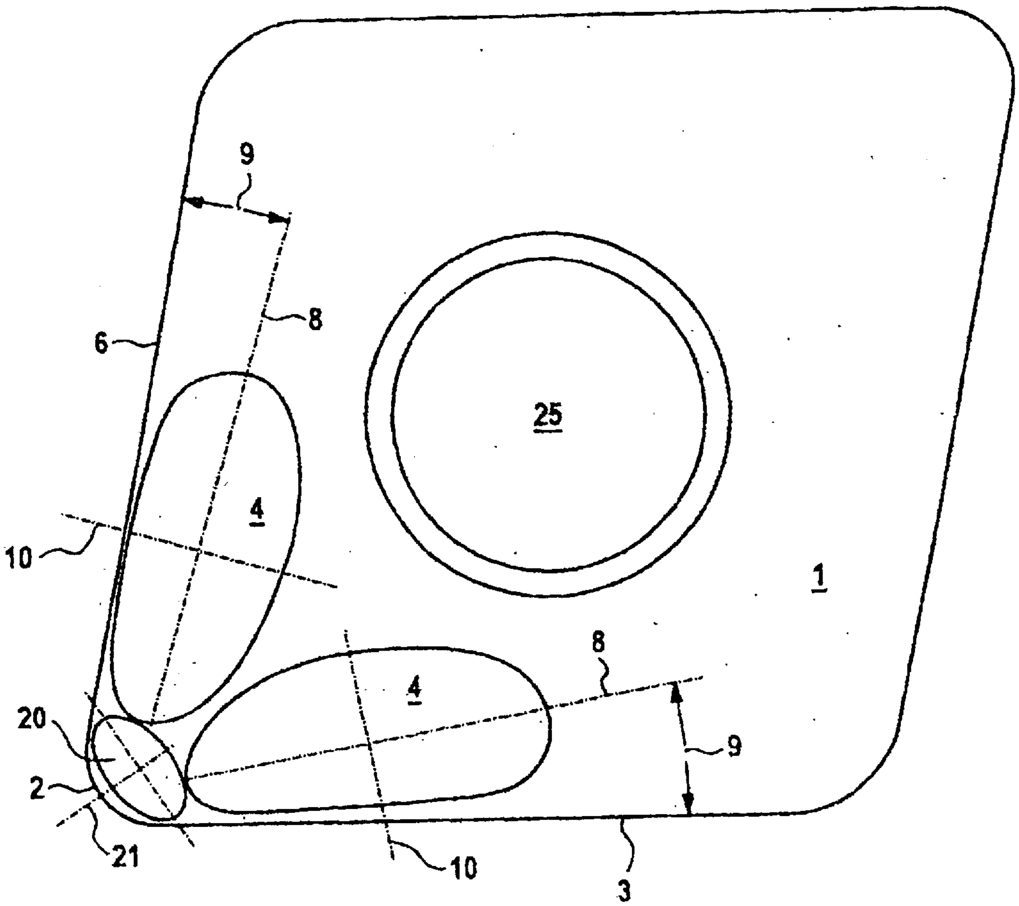
FIG. 1 is a plan view from overhead of the cover surface or face of a cutting insert as claimed by the invention.

The cutting insert has a cover surface 1 with a diamond-shaped, i.e. rhombic contour. Each cover surface 1 contains two cutting tips 2 each with cutting edges 3, 6 that are used either as a major or minor cutting edge. In spite of the presence on both sides of an identically configured cover surface 1, the drawings show only one side of a cover surface 1 in detail and provided with reference numbers. The other cover surface which is not shown is realized analogously, and runs parallel to the cover surface 1 illustrated in the plan view from overhead. The indexable cutting insert is penetrated by a through hole 25, in which a clamping bolt that fixes the indexable cutting insert to a holder is inserted or engaged.

For the sake of simplicity, FIGS. 9 to 26 show the chip flute 4 which is essential to the invention only in association with the upper left cutting tip 2 and the left major cutting edge 3. Whether one of the cutting edges 3, 6 is the major or the minor cutting edge depends on the feed direction of the tool during the cutting process. To that extent, the cutting edge 6 in turn can be the major cutting edge and cutting edge 3 the minor cutting edge. In the description, however, to make a clearer distinction, cutting edge 3 is referred to as the major cutting edge and cutting edge 6 as the minor cutting edge.

Figure 4:
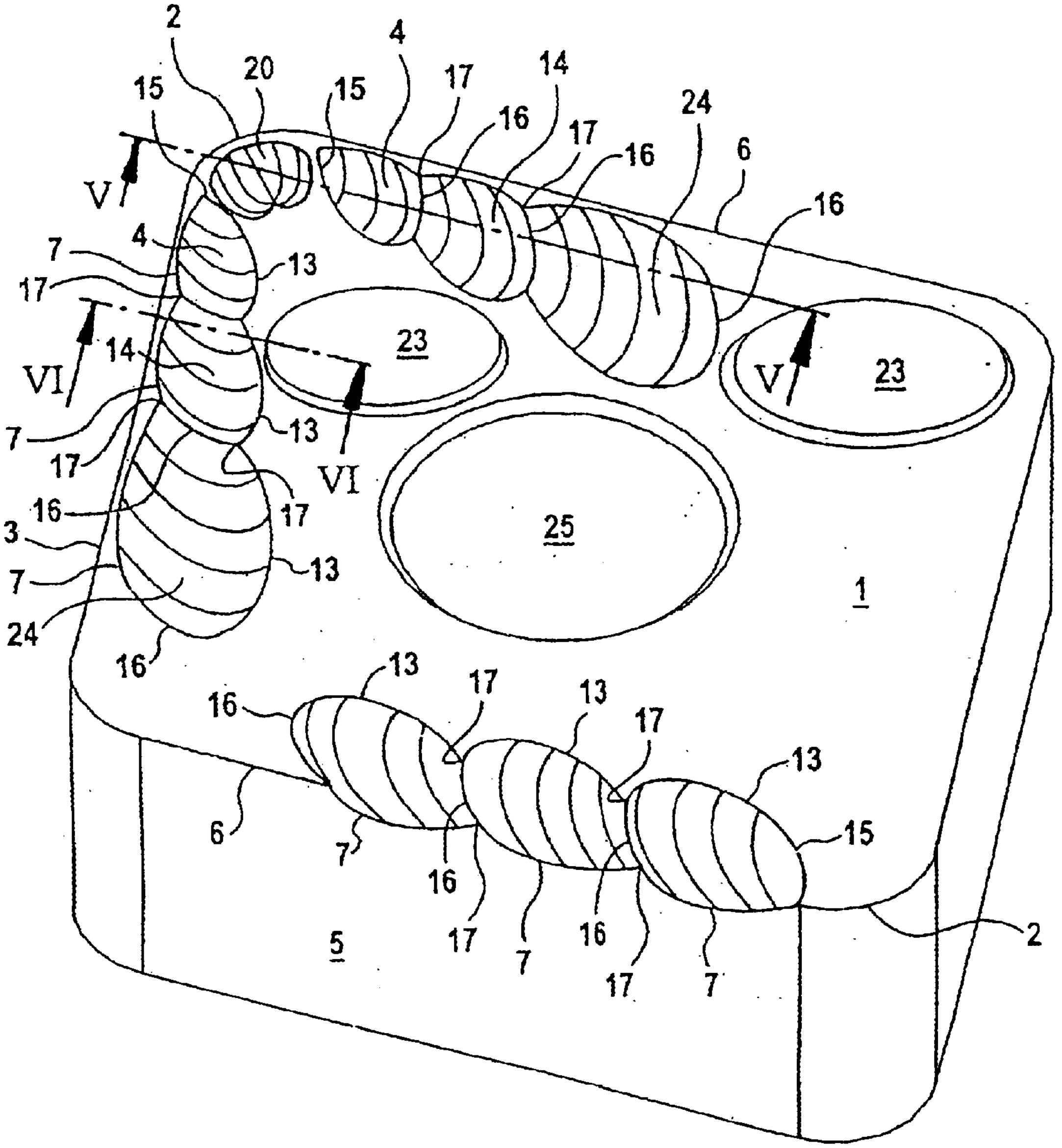
FIG. 4 is perspective view from overhead of a modified embodiment of the cutting insert.

The surface and contour of the chip flute 4 are shaped similar to the surface and contour of an asymmetrically oval hollowed-out shell. But in the case of the embodiments illustrated in FIG. 4 (lower right cutting tip 2), 11–14, 17–20 and 23–26, there is a completely oval hollowed-out shell with respect to the side of the chip trough 4 facing away from the cutting edge 3, 6. In FIG. 4, the chip trough 4 is positioned close to the cutting edge 3 or 6 so that, with its cutting-edge-side longitudinal side 7, which faces toward cutting edge 3 or 6 and extends in approximately the direction of the major axis 8 of chip flute 4, it merges, at least with the longitudinal side's central area (FIGS. 11, 12, 17, 18, 23 and 24) or even completely (FIGS. 4, 13, 14, 19, 20, 25, and 26) into the cutting edge 3, 6 or into the flank 5 located below cutting edge 3, 6.

The word "oval" is frequently used to describe the shape of a chip trough 4, 14, 24, 34. According to the Brockhaus Encyclopedia, 19th Edition, an oval is a closed plane curve with an overall positive curvature which has four or more vertices. An oval is thus loosely equivalent to an ellipse.

Figure 5:
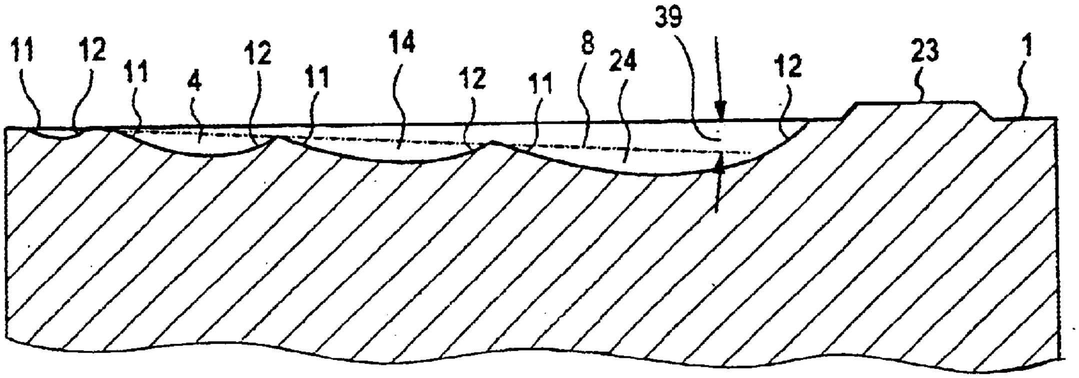
FIG. 5 is a longitudinal section corresponding to line V—V in FIG. 4.
Figure 6:
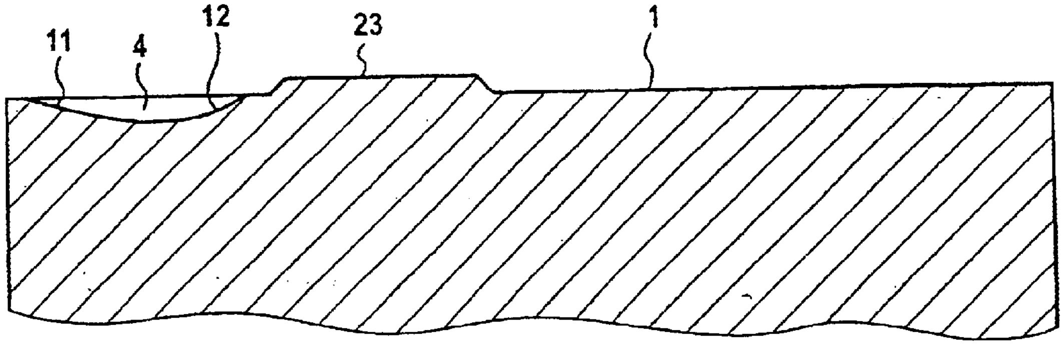
FIG. 6 is a cross-section corresponding to line VI—VI in FIG. 4.

The major axis 8 of the oval contour of chip flute 4 extends essentially parallel to one of the cutting edges 3, 6. "Essentially" in this case does not mean that it is exactly parallel. Rather, the direction of major axis 8 of the oval of the contour of the chip flute 4 can form an acute angle 9 of up to approximately 20° with cutting edge 3, 6. The cross-sectional profile of the surface of chip flute 4, both in the direction of major axis 8 and minor axis 10 of the oval shape, has a less pronounced curvature on the side 11 facing toward the cutting tip 2 or cutting edge 3 or 6 than on the other side 12 facing away from cutting tip 2 and cutting edges 3, 6 (FIGS. 5, 6).

The oval shape is also asymmetrical, with the consequences that the contour of chip flute 4 that is formed in the face, which is identical to cover surface 1, is asymmetrical. Specifically, the longitudinal side 7 of the oval facing toward the adjacent cutting edge 3, 6, i.e. the longitudinal side 7 on the side of the cutting edge, has a curvature which is less pronounced than the curvature of the side facing away from the flanking cutting edge 3, 6, i.e. the longitudinal side 13 farther from the cutting edge. In the embodiment illustrated in FIGS. 1–3, 4 (upper left cutting tip 2), 7–10, 15, 16, 21, and 22, the chip flute 4 with its asymmetrically oval contour is completely recessed into the face 1 of cutting edge 3, 6. In the embodiment illustrated in FIGS. 11, 12, 17, 18, 23, and 24, the chip flute 4, with a central area of its longitudinal side 7 that faces the cutting edge, terminates in the flank 5 of the cutting edge 3, 6. In the embodiment illustrated in FIGS. 4 (lower right tip 2), 13, 14, 19, 20, 25, and 26, the chip flute 4, with its entire longitudinal side facing the cutting edge 3, terminates in the flank 5 of cutting edge 3, 6. This configuration is due to the fact that in this embodiment, the chip flute 4 is positioned particularly close to the flank 5.

In the embodiments illustrated in FIGS. 4 and 15–26, along each cutting edge 3, 6, a plurality of asymmetrical oval chip flutes 4, 14, 24, 34, etc. are arranged end-to-end approximately in the direction of the major axis 8 of their oval shape. Adjacent end-to-end chip flutes 4 merge into one other such that the longitudinal sides 7, 13 of the oval contour of adjacent cutting flutes 4, 14, 24, 34 run directly together or merge into each other so that the narrow sides 15, 16 of their oval contour are eliminated (FIG. 4) and an obtuse-angled ridge or gusset 17 is formed.

In the embodiment illustrated in FIGS. 15–20, the chip flutes 4, 14, 24, 34 are all of equal size. They are placed end-to-end, essentially in the longitudinal direction of the cutting edge 3, 6 flanking them. In the embodiment illustrated in FIG. 4, upper left cutting tip 2, and FIGS. 21–26, the size of the end-to-end chip flutes 4, 14, 24, 34 increases with increasing distance from the associated cutting tip.

Figure 7:
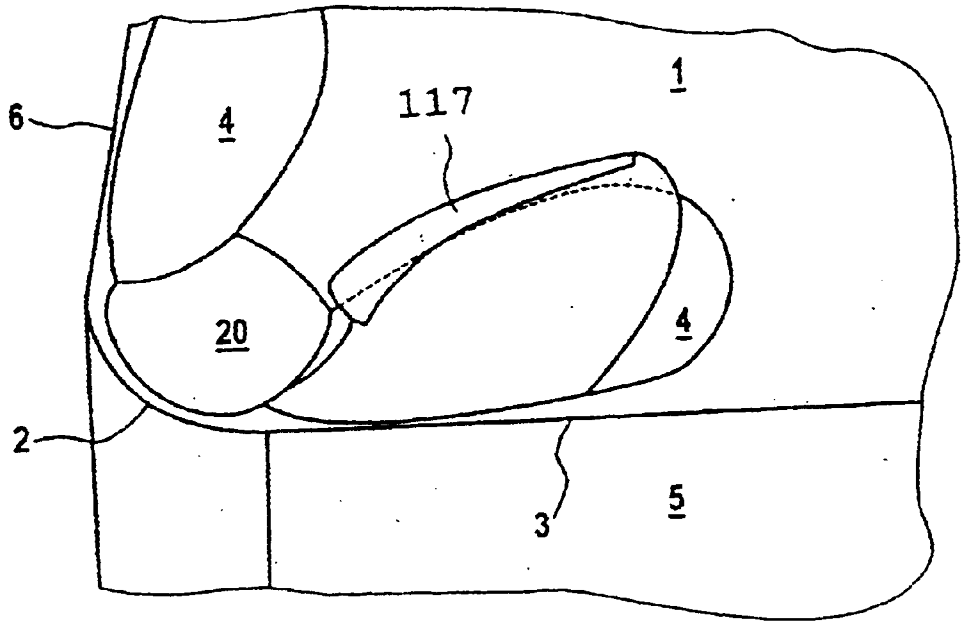
FIG. 7 is a view of the cutting tip of the cutting insert similar to FIG. 2 with a chip formed in a chip flute designed according to the invention.
Figure 8:
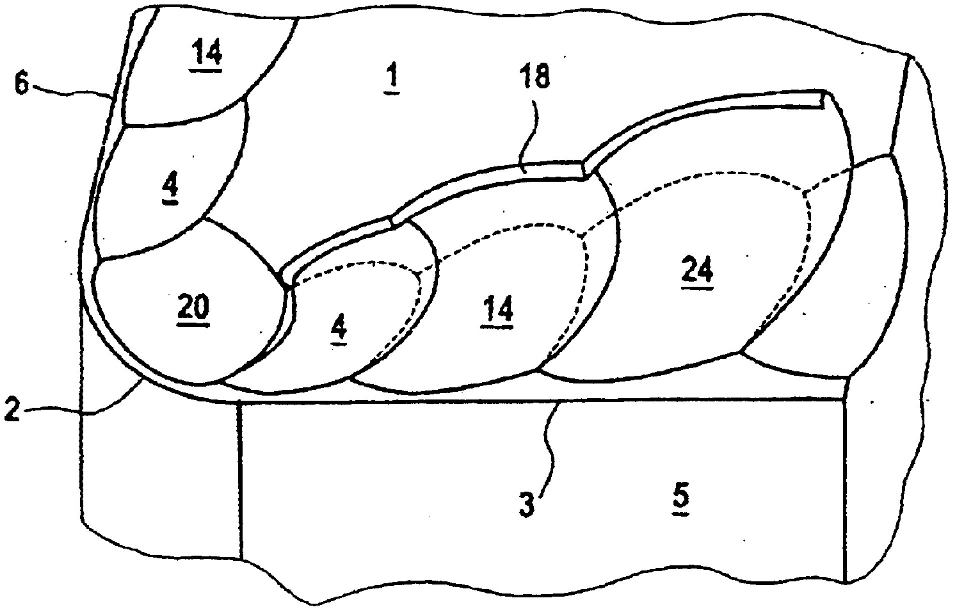
FIG. 8 is a view analogous to FIG. 7 with a modified embodiment of the cutting insert illustrated in FIG. 4.
Figure 27:
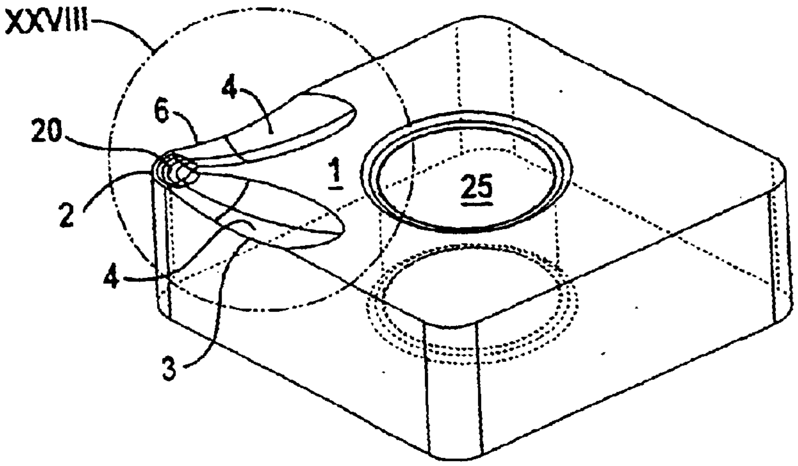
FIG. 27 is a view in perspective of an indexable cutting insert analogous to the one illustrated in FIG. 13.
Figure 28:
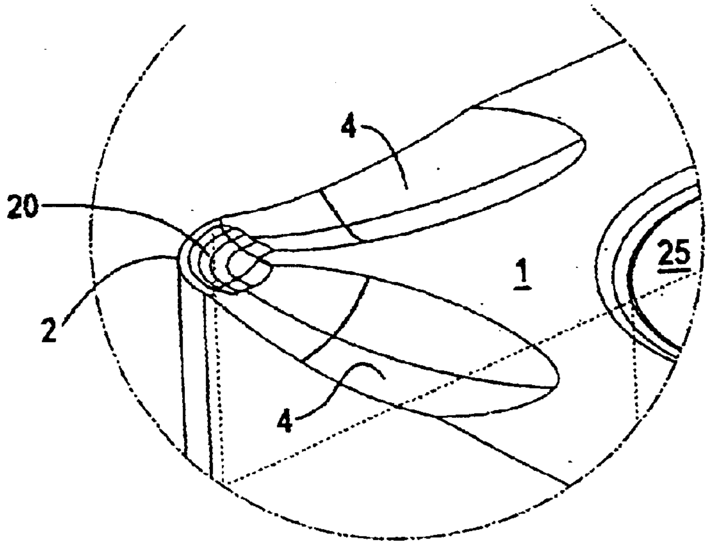
FIG. 28 is an enlarged illustration of the area XXVIII in FIG. 27.
Figure 29:
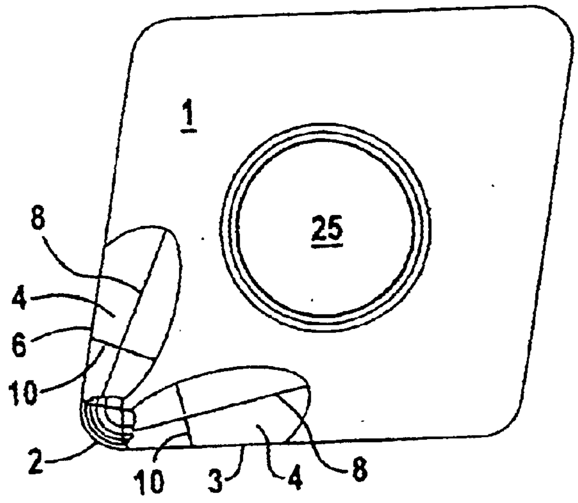
FIG. 29 is a plan view from overhead of the indexable cutting insert illustrated in FIG. 27.

FIGS. 7 and 8 show the chips or chip shapes 117, 18 that are formed in chip flutes 4, 14, and 24. In the space between each cutting tip 2 and the chip flutes 4 flanking its two cutting edges 3, 6, an oval-shell-type central flute 20 with a symmetrically oval, particularly elliptical contour is made in the face 1. The minor axis 21 of the oval shape (FIG. 1) forms the bisecting line of the angle formed by the two cutting edges 3, 6.

The cover surfaces 1 on either side of the cutting insert, in their inner area located between the chip flutes 4, 14, 24, 34, may carry support elements 23 whose flat cover surfaces extend parallel to cover surface 1 of the cutting insert and project above the level of cover surface 1. A one-sided cutting insert is also possible.

The central flute 20 is realized in the exemplary embodiments illustrated in FIGS. 1 to 4 in the form of a discrete element isolated by the chip flutes 4. That is the case, for example, in the exemplary embodiments illustrated in FIGS. 9 to 26. In the exemplary embodiments illustrated in FIGS. 7 and 8, on the other hand, the central flute 20 makes a more or less continuous transition into the neighboring chip flutes 4. That is also the case in the exemplary embodiments illustrated in FIGS. 27 to 38.

Figure 30:
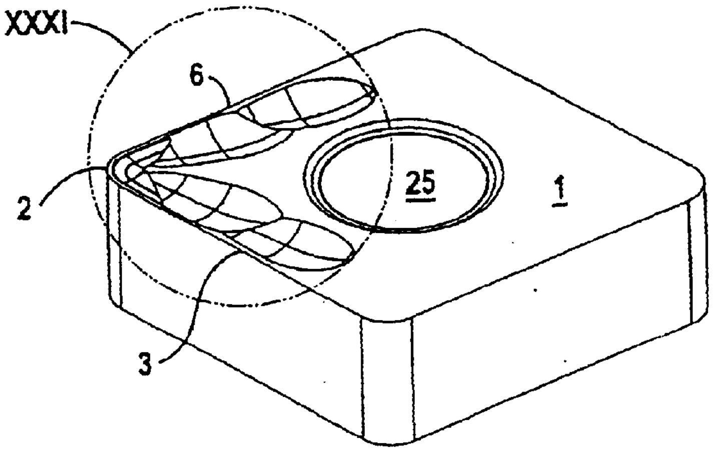
FIG. 30 is a view in perspective of an indexable cutting insert with two chip flutes flanking the cutting edges, one on each side of the cutting tip.
Figure 31:
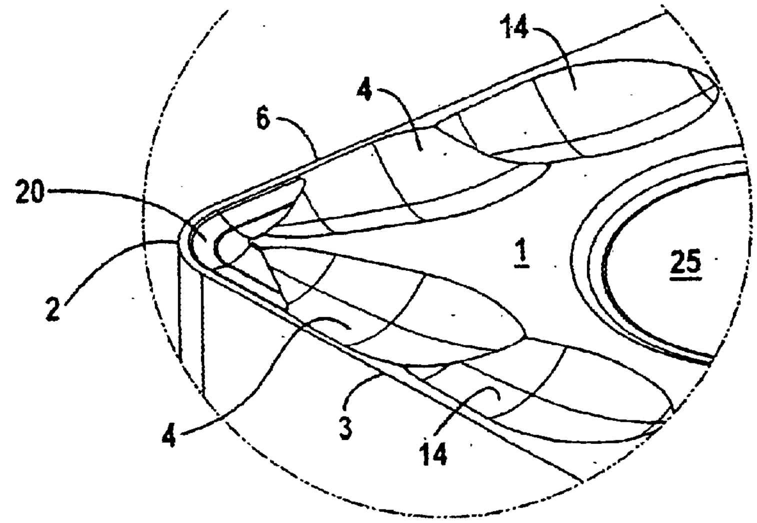
FIG. 31 is an enlarged illustration of the area XXXI in FIG. 30.
Figure 32:
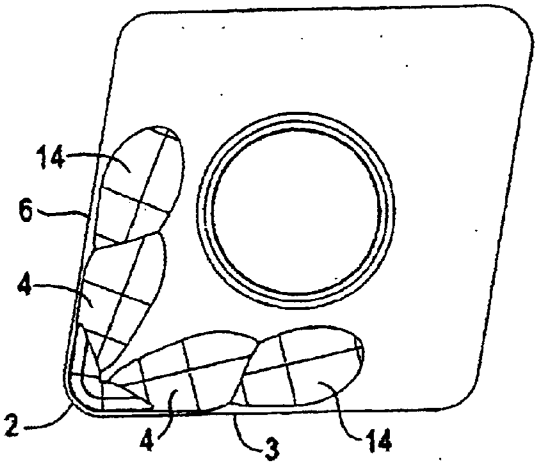
FIG. 32 is a plan view from overhead of the indexable cutting insert illustrated in FIG. 30.
Figure 33:
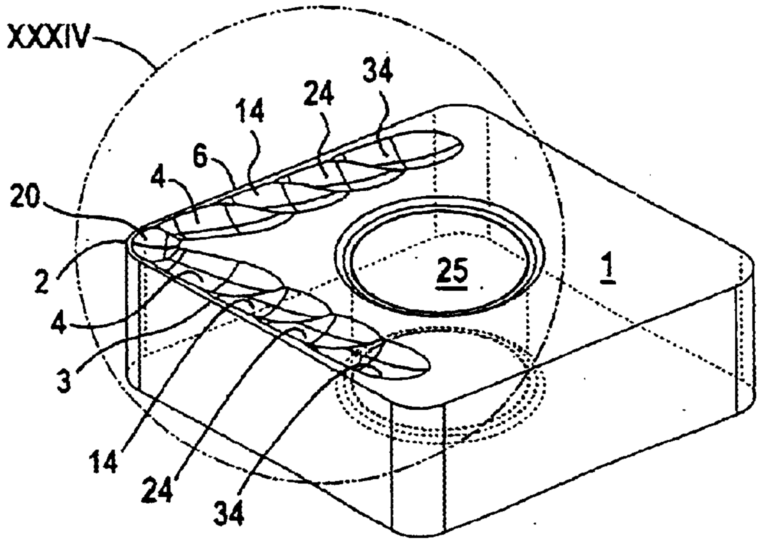
FIG. 33 is a perspective view of an indexable cutting insert analogous to the one illustrated in FIG. 15.
Figure 34:
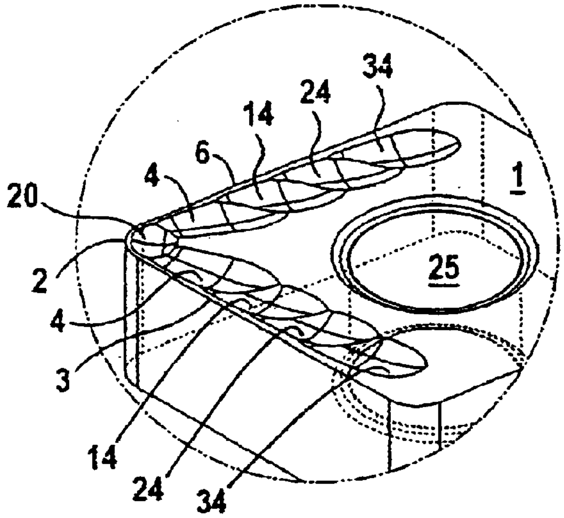
FIG. 34 is an enlarged detail illustration of the area XXXIV illustrated in FIG. 33.
Figure 35:
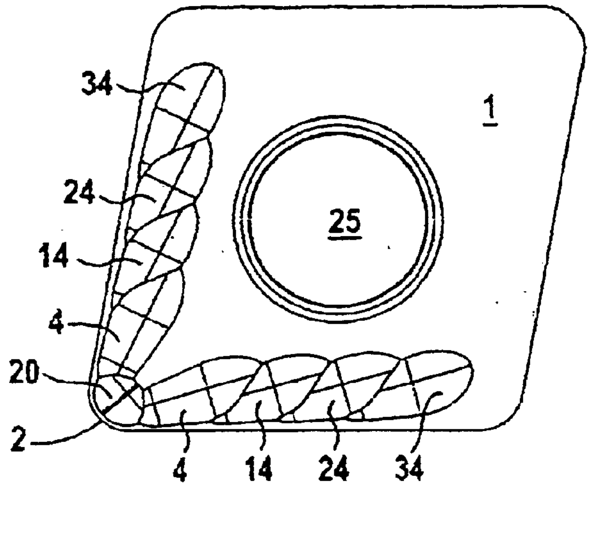
FIG. 35 is an overhead view of the cover surface of the indexable cutting insert illustrated in FIG. 33.
Figure 36:
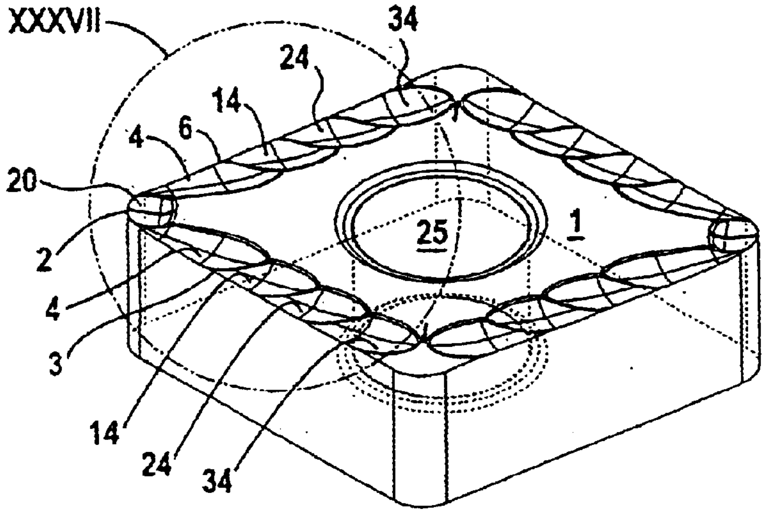
FIG. 36 is a view in perspective of an indexable cutting insert similar to the one illustrated in FIG. 19.
Figure 37:
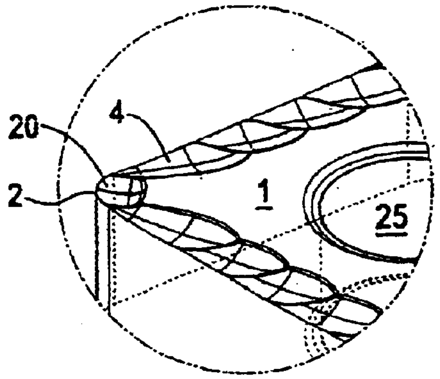
FIG. 37 is an enlarged detail illustration of the area XXXVII in FIG. 36.
Figure 38:
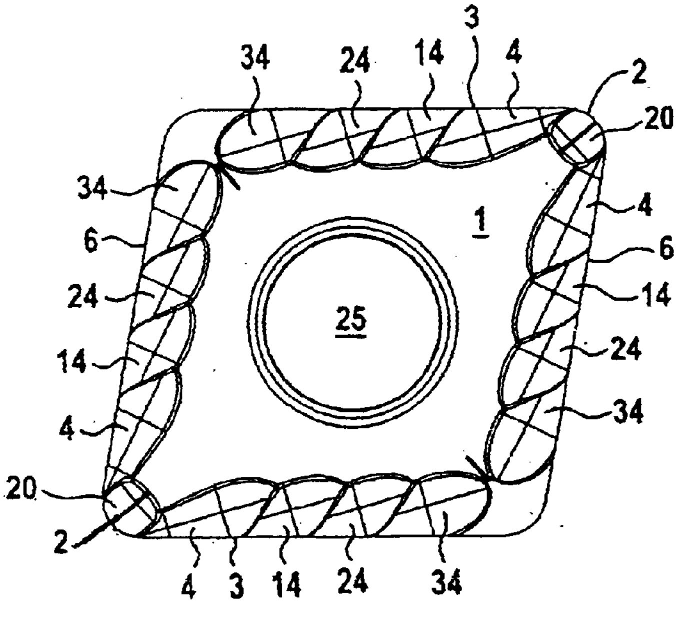
FIG. 38 is a plan view from overhead of the indexable cutting insert illustrated in FIG. 36.

In FIGS. 30–32, the ridges or gussets, similar to those shown in FIG. 4, between the separate depressions in the chip flute are formed at an angle with respect to the cutting edges 3, 6. These ridges may be essentially straight or have a slight curvature. In FIGS. 33–35, the ridges are curved. In FIGS. 36–38, the ridges are curved into a slight S-shape. Possible curves and shapes for the ridges other than the ones shown may be developed in other possible embodiments of the present invention.

Figure 3:
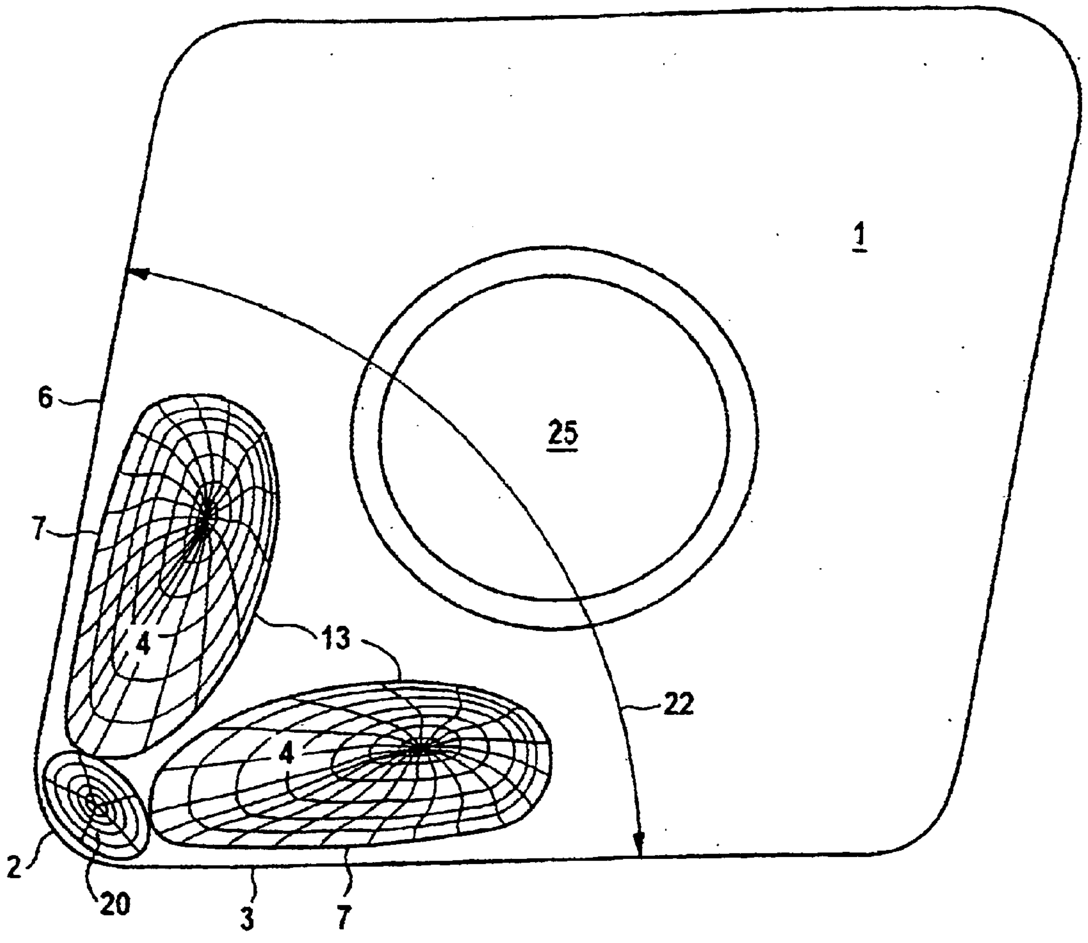
FIG. 3 is a plan view from overhead analogous to FIG. 1, including contour lines drawn into the chip flutes to make clear the asymmetry of their oval form.

FIG. 3 also shows a cutting tip angle 22.

Figure 1A:
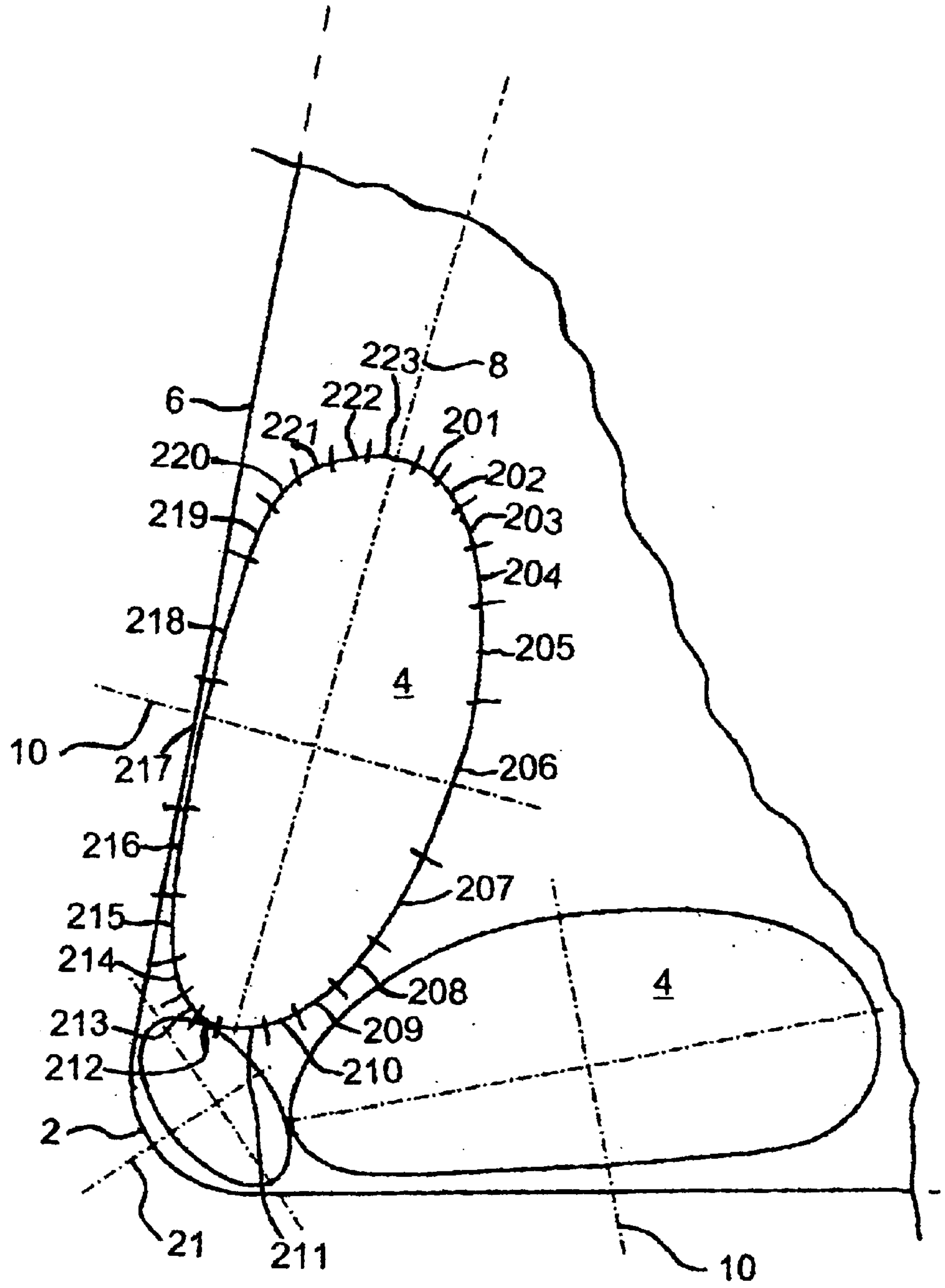
FIG. 1A is an enlarged view of a portion of the cutting insert shown in FIG. 1 with sections defining different radii of curvature.
Figure 2:
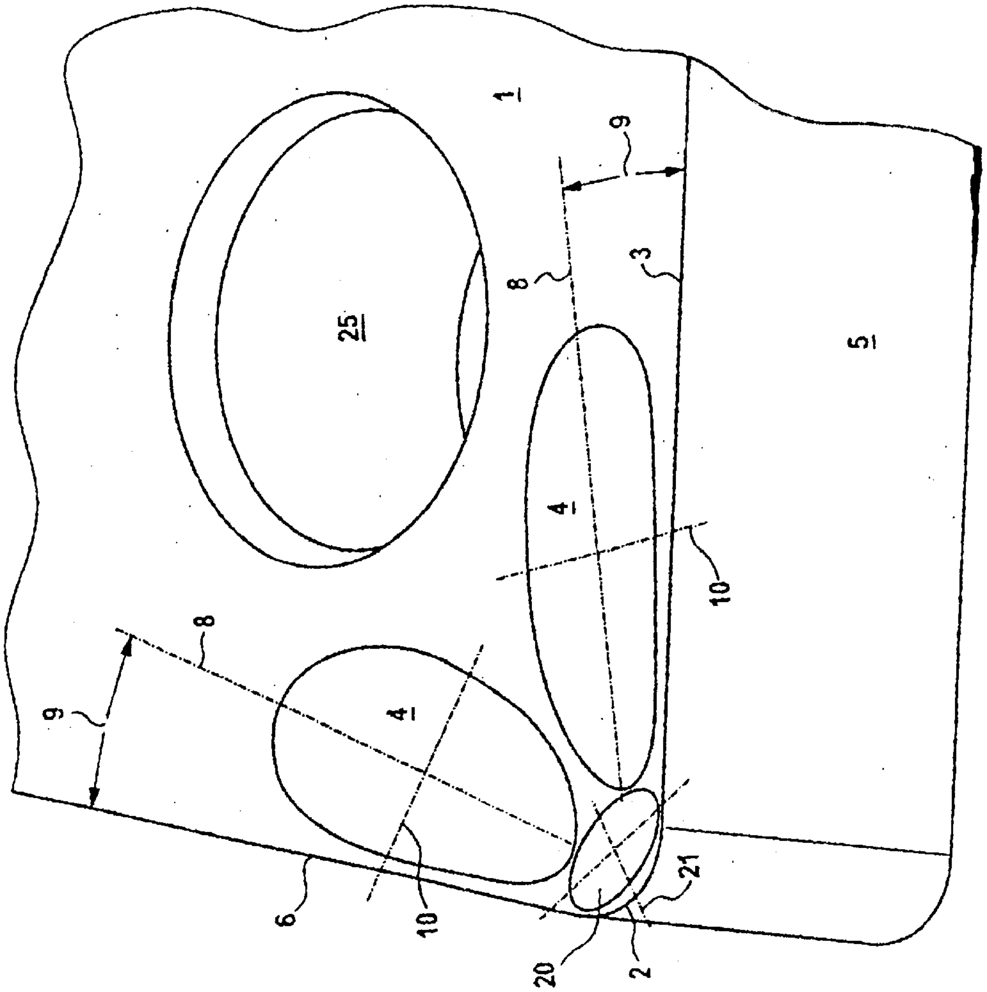
FIG. 2 is a perspective view of the cutting insert similar to FIG. 1.

FIG. 1A is an enlarged view of a portion of the cutting insert shown in FIG. 1 with sections defining different radii of curvature. The different radii of curvature show the asymmetry of the substantially ellipse-shaped perimeter edge of the chip flute 4. A symmetrical ellipse, if bisected longitudinally, for example, would have two sides that would be mirror images of each other, and thus would also have mirrored sections with radii of curvature that would be virtually identical. As can be seen in FIG. 1A, the various sections do not have identical radii of curvature and do not mirror corresponding sections opposite to them. The following Table 1 lists the various radii of curvature of the sections 201 to 223 shown FIG. 1A. It should be noted that the measurements are relative measurements which are simply provided for purposes of example only. It should be understood that the asymmetrical chip flute 4 may have any number of varying radii of curvature at different sections, including, but not limited to, the samples listed below, depending on the desired size and shape of the chip flute 4.

TABLE 1 for FIG. 1A

| Segment | Radius of Curvature |
|---|---|
| 201 | 13.0 |
| 202 | 14.0 |
| 203 | 24.5 |
| 204 | 36.5 |
| 205 | 60.0 |
| 206 | 94.5 |
| 207 | 47.0 |

TABLE 1-continued for FIG. 1A

| Segment | Radius of Curvature |
|---|---|
| 208 | 38.5 |
| 209 | 22.5 |
| 210 | 18.5 |
| 211 | 13.5 |
| 212 | 12.0 |
| 213 | 11.5 |
| 214 | 18.0 |
| 215 | 38.0 |
| 216 | 136.0 |
| 217 | 139.5 |
| 218 | 139.0 |
| 219 | 61.5 |
| 220 | 9.0 |
| 221 | 15.5 |
| 222 | 29.0 |
| 223 | 15.0 |

Figure 3A:
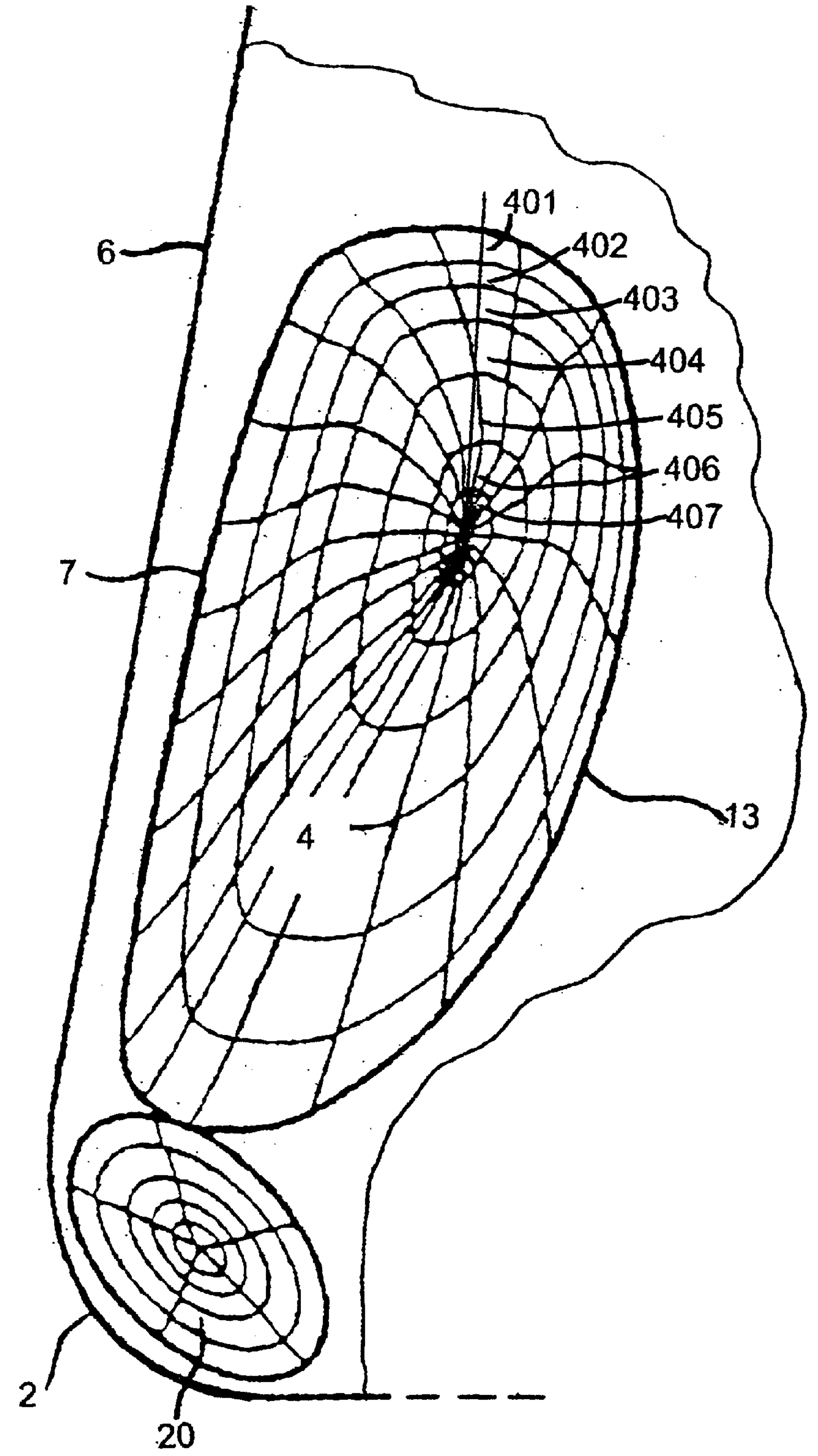
FIG. 3A is an enlarged view of a portion of the cutting insert shown in FIG. 3 with marked sections indicating the varying depths of the chip flute represented by the contour lines.
Figure 3B:
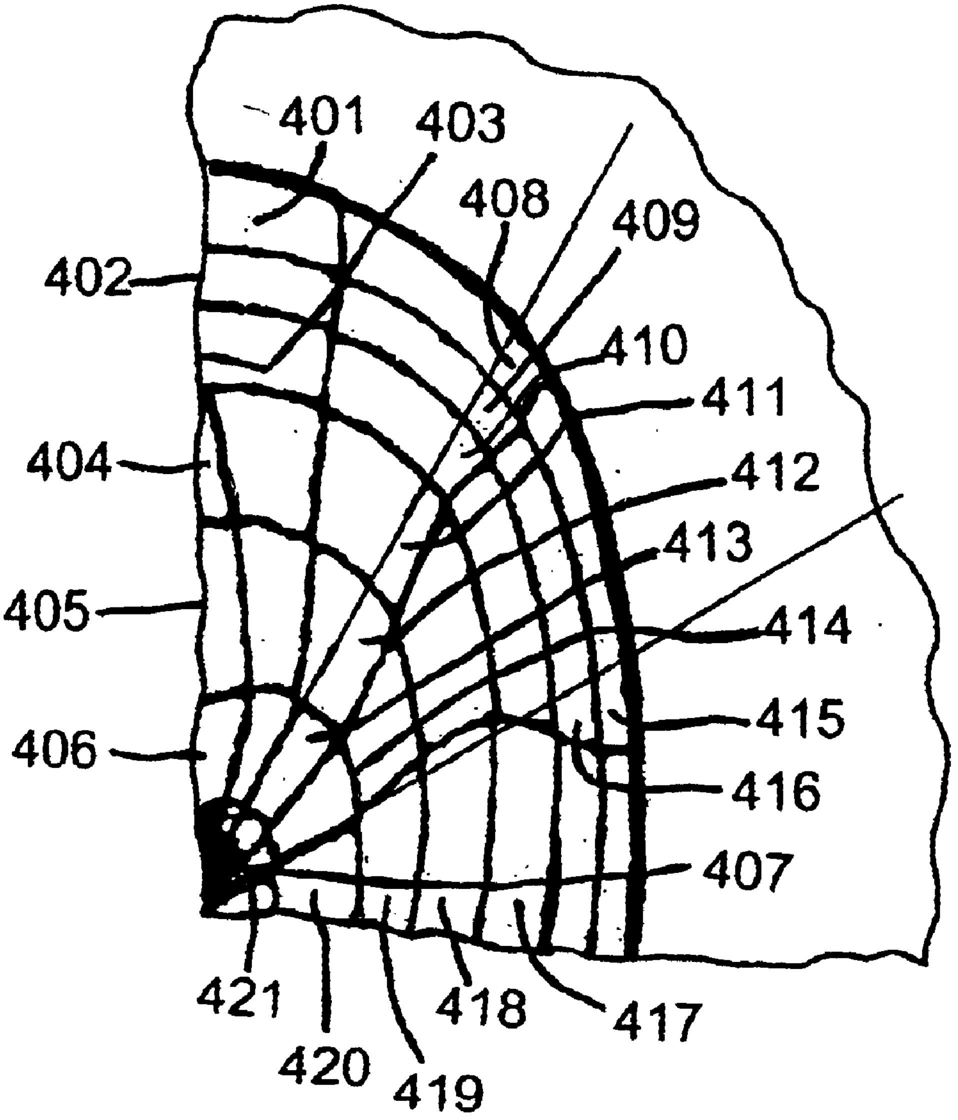
FIG. 3B is an enlarged view of the upper right quadrant of the view in FIG. 3A with additional marked sections.
Figure 3C:
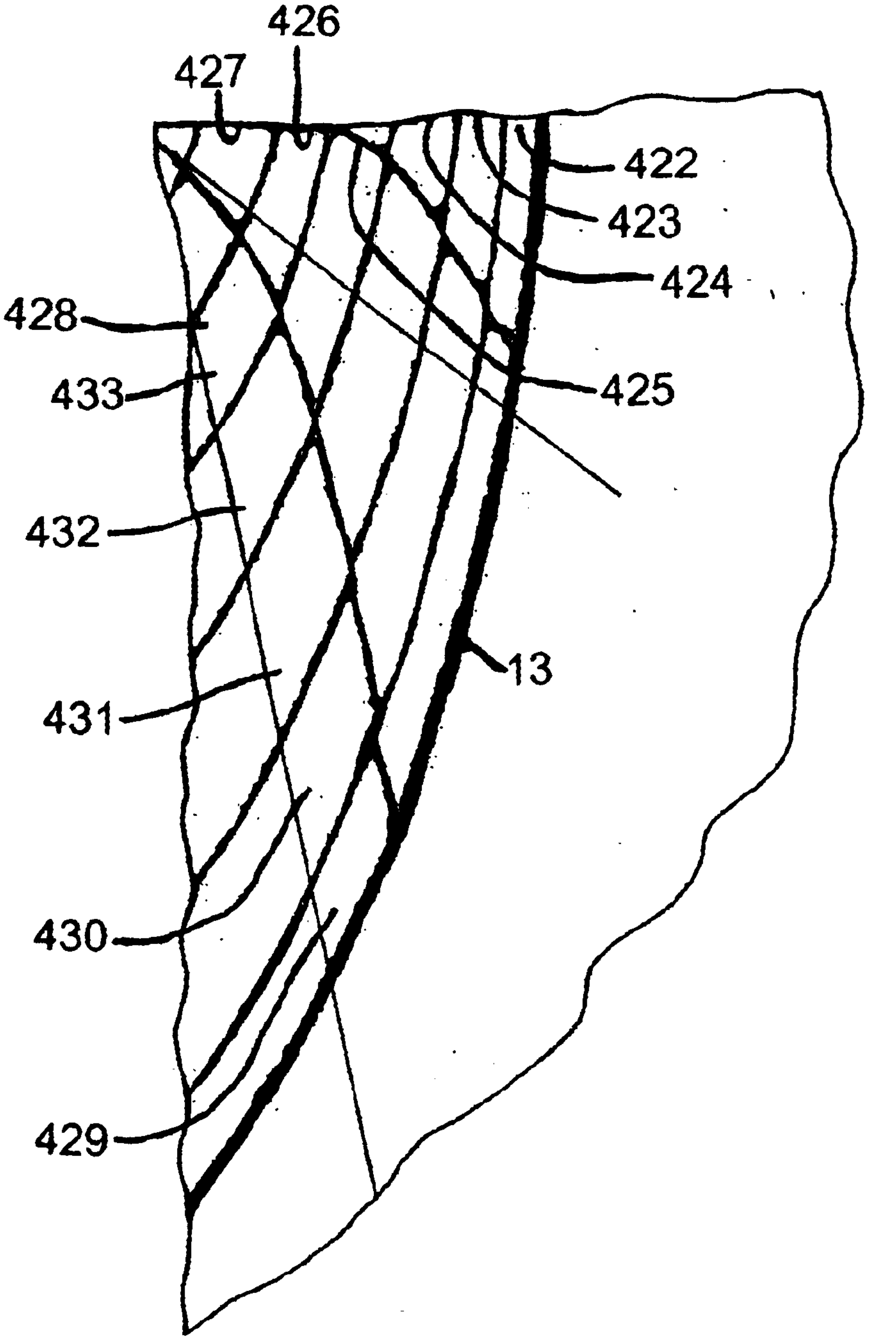
FIG. 3C is an enlarged view of the lower right quadrant of the view in FIG. 3A with additional marked sections.
Figure 3D:
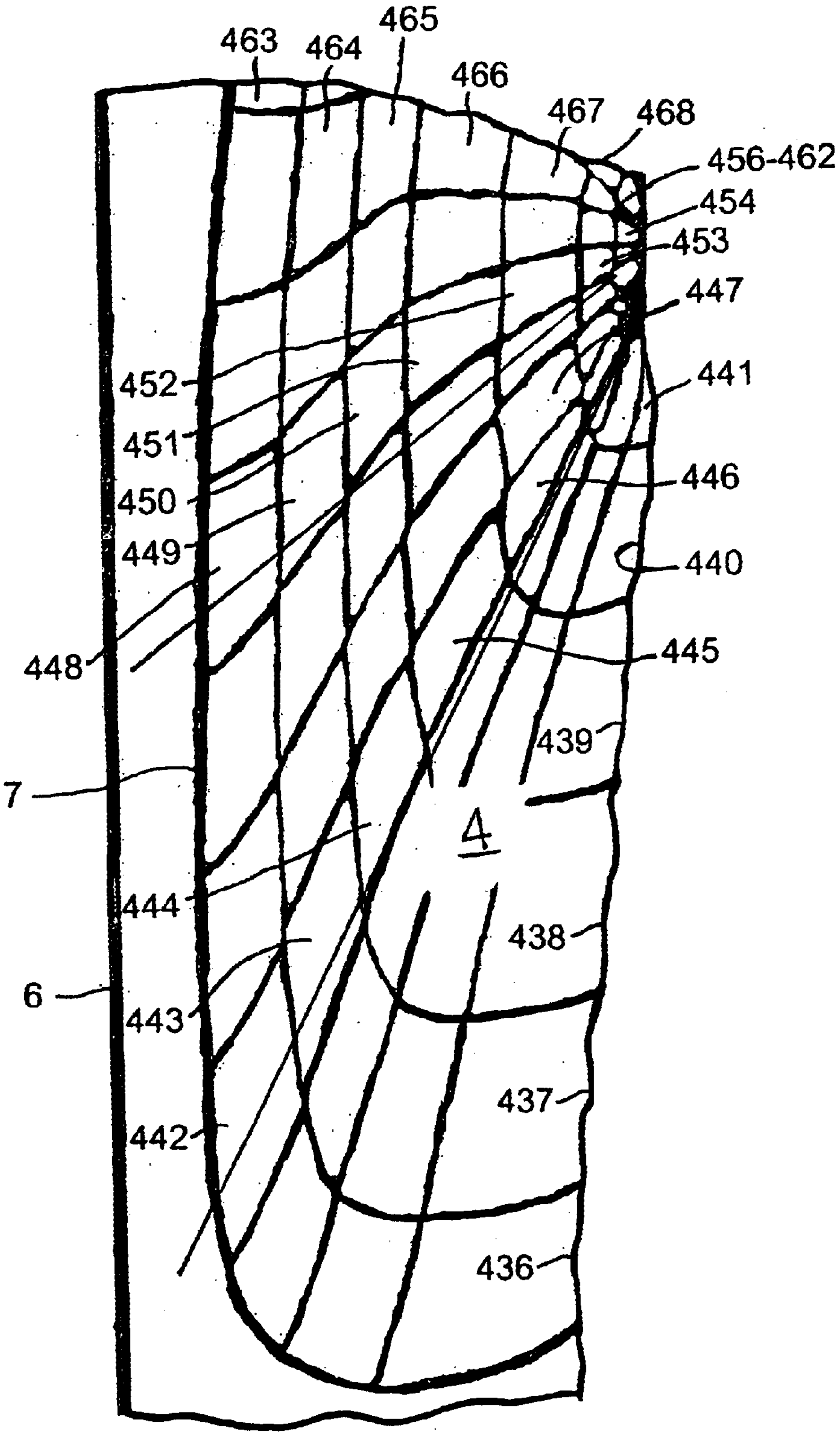
FIG. 3D is an enlarged view of the lower left quadrant of the view in FIG. 3A with additional marked sections.
Figure 3E:
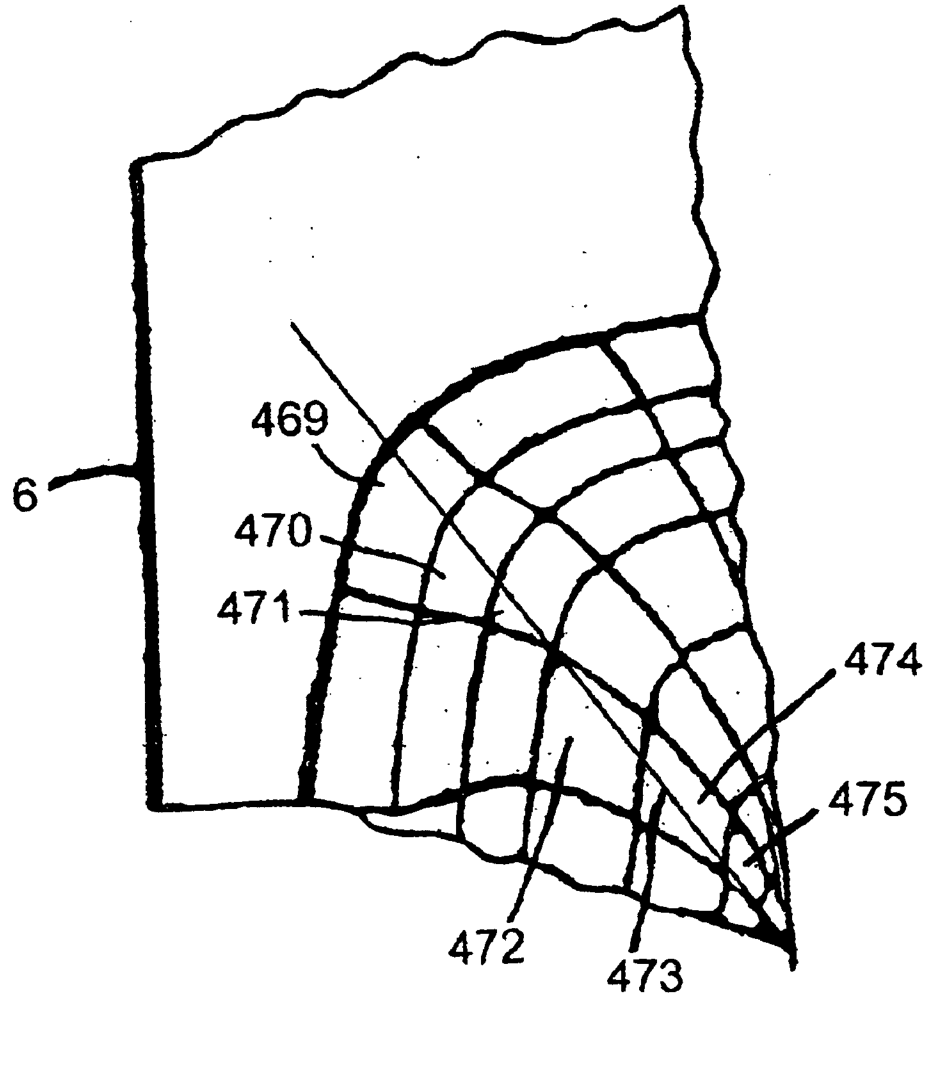
FIG. 3E is an enlarged view of the upper left quadrant of the view in FIG. 3A with additional marked sections.

FIG. 3A is an enlarged view of a portion of the cutting insert shown in FIG. 3 with measurements of the sections 401 to 407 shown in Table 3A indicating the varying depths of the chip flute 4 represented by the contour lines. The deepest point of the chip flute 4 is the point at which all the contour lines converge in FIGS. 3 and 3A. Assuming that the cover face 1 defines a plane that stretches across the chip flute 4, the deepest point would be the point located on the surface of the chip flute 4 that is farthest from the cover face plane on a line perpendicular to the plane. In other words, the length of a perpendicular line from the cover face plane to the deepest point would be greater than the length of a perpendicular line from the cover face to any other point on the surface of the chip flute 4. The deepest point is therefore the exact same distance in depth from any point along the perimeter edge of the chip flute 4. Consequently, each contour line stretching from the perimeter edge of the chip flute 4 to the deepest point represents the same depth. However, the lengths of the lines along the surface of the chip flute 4 are clearly different. The deepest point is offset in FIGS. 3 and 3A a substantial distance away from the geometric center point of the chip flute 4. The geometric center point is defined, in at least one possible embodiment of the present invention, as the intersection point of the major axis 8 and the minor axis 10, as shown in FIG. 1. By offsetting the deepest point, the slope of the surface of the chip flute 4 varies in different sections of the surface, as evidenced by the contour lines. FIG. 3B is an enlarged view of the upper right quadrant of the view in FIG. 3A with additional marked sections 408–421. FIG. 3C is an enlarged view of the lower right quadrant of the view in FIG. 3A with additional marked sections 422–433. FIG. 3D is an enlarged view of the lower left quadrant of the view in FIG. 3A with additional marked sections 434–468. FIG. 3E is an enlarged view of the upper left quadrant of the view in FIG. 3A with additional marked sections 469–475. The depths indicated in Table 2 are relative measurements, one to the other, just like in Table 1, and are not meant to represent dimensions in any system of measurement.

TABLE 2 for FIGS. 3A–3E

| Segment | Distance |
|---|---|
| 401 | 5.5 |
| 402 | 4.5 |
| 403 | 5.5 |
| 404 | 9.5 |
| 405 | 12.5 |
| 406 | 8.0 |
| 407 | 2.0 |
| 408 | 5.0 |
| 409 | 4.0 |
| 410 | 5.0 |
| 411 | 8.0 |
| 412 | 9.0 |
| 413 | 8.0 |
| 414 | 3.0 |
| 415 | 3.0 |
| 416 | 3.5 |
| 417 | 4.5 |
| 418 | 5.5 |
| 419 | 6.0 |
| 420 | 6.0 |
| 421 | 3.5 |
| 422 | 3.0 |
| 423 | 4.0 |
| 424 | 5.5 |
| 425 | 5.0 |
| 426 | 4.5 |
| 427 | 5.5 |
| 428 | 3.5 |
| 429 | 6.0 |
| 430 | 10.0 |
| 431 | 12.5 |
| 432 | 10.5 |
| 433 | 8.5 |
| 434 | 8.0 |
| 435 | 3.5 |
| 436 | 14.5 |
| 437 | 18.5 |
| 438 | 19.0 |
| 439 | 17.0 |
| 440 | 14.0 |
| 441 | 10.0 |
| 442 | 16.0 |
| 443 | 15.0 |
| 444 | 14.5 |
| 445 | 17.5 |
| 446 | 15.0 |
| 447 | 6.0 |
| 448 | 9.5 |
| 449 | 9.0 |
| 450 | 8.5 |
| 451 | 7.0 |
| 452 | 10.0 |
| 453 | 9.5 |
| 454 | 4.0 |
| 455 | 3.0 |
| 456 | 7.5 |
| 457 | 6.0 |
| 458 | 5.5 |
| 459 | 8.5 |
| 460 | 6.5 |
| 461 | 3.0 |
| 462 | 2.5 |
| 463 | 7.0 |
| 464 | 6.0 |
| 465 | 5.0 |
| 466 | 8.5 |
| 467 | 7.5 |
| 468 | 3.5 |
| 469 | 7.0 |
| 470 | 6.0 |
| 471 | 6.5 |
| 472 | 10.5 |

TABLE 2-continued for FIGS. 3A–3E

| Segment | Distance |
|---|---|
| 473 | 10.5 |
| 474 | 3.5 |
| 475 | 2.5 |

One feature of the invention resides broadly in a cutting insert, particularly indexable insert for chip-removing machining of metal workpieces with at least one cutting edge 3, 6 and at least one chip flute 4 flanking the cutting edge 3, 6 made in the face 1 to shape and guide the chip that has been separated and is being removed from the workpiece, characterized by the fact that the surface of the chip flute 4 is realized similar to the surface of an asymmetrical oval hollowed-out shell, whereby the asymmetry of the oval curved shape of a profile cross section of the shell surface consists of the fact that the profile cross section in the direction of the major axis 8 and minor axis 10 has a curvature which is less pronounced on its side facing the cutting tip 2 and the cutting edge 3, 6 than on its side facing away from the cutting tip 2 and the cutting edge 3, 6.

Another feature of the invention resides broadly in the cutting insert, characterized by the fact that the major axis 8 of the asymmetrical oval curve-shaped hollowed-out chip flute 4 essentially flanks the cutting edge 3, 6, and in particular encloses an acute angle 9, 39 converging toward the cutting tip 2 from 1° to 20° with the cutting edges 3, 6 or with the cover surface 1 enclosed between them.

Yet another feature of the invention resides broadly in the cutting insert, characterized by the fact that the chip flute 4 is hollowed out with an asymmetrical oval hollowed-out contour completely in the face 1 of the cutting edge 3, 6.

Still another feature of the invention resides broadly in the cutting insert, characterized by the fact that the chip flute 4 ends in with one part, in particular with a middle portion of its longitudinal flank 7 facing the cutting edge 3, 6, that runs into the flank 5 of the cutting edge 3, 6.

A further feature of the invention resides broadly in the cutting insert, characterized by the fact that the chip flute 4, with its entire longitudinal side 7 facing toward the cutting edge 3, terminates in the flank 5 of the cutting edge 3, 6.

Another feature of the invention resides broadly in the cutting insert as claimed in one or more of the preceding claims, characterized by the fact that along each cutting edge 3, 6 there are a plurality of asymmetrical oval chip flutes 4, 14, 24, 34 oriented end-to-end approximately in the direction of the major axis 8 of their oval shape.

Yet another feature of the invention resides broadly in the cutting insert, characterized by the fact that adjacent end-to-end chip or cutting flutes 4 merge into each other such that the longitudinal sides 7, 13 of the oval contour of adjacent cutting flutes 4, 14, 24, 34 merge directly into each other while the narrow sides 15, 16 of their oval contour are eliminated and an obtuse-angled gusset 17 is formed by each.

Still another feature of the invention resides broadly in the cutting insert, characterized by the fact that the chip flutes 4,14, 24, and 34 are of approximately equal size.

A further feature of the invention resides broadly in the cutting insert, characterized by the fact that the chip flutes 4, 14, 24, 34 are arranged end to end essentially in the longitudinal direction of the cutting edge 3, 6 flanking them.

Another feature of the invention resides broadly in the cutting insert, characterized by the fact that the size of the ovals of the end-to-end chip flutes 4, 14, 24, 34 increases with increasing distance from the cutting tip 2.

Yet another feature of the invention resides broadly in the cutting insert, characterized by the fact that a central flute 20 is introduced into the face 1 in the space between the cutting tip 2 and the chip flutes 4 flanking its two cutting edges 3, 6.

Still another feature of the invention resides broadly in the cutting insert, characterized by the fact that its cover surfaces 1 on either side, in their inner area located between the chip flutes 4, 14, 24, 34, carry support elements 23 that project above the respective cover surface 1.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Application No. 199 20 192.7, filed on May 3, 1999, having inventor Rudi HARTLÖHNER, and DE-OS 199 20 192.7, having inventor Rudi HARTLÖHNER, and DE-PS 199 20 192.7, having inventor Rudi HARTLÖHNER, and International Application No. PCT/EP00/0388, filed on Apr. 28, 2000, having inventor Rudi HARTLÖHNER, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

The following U.S. patents regarding cutting tool and/or inserts for cutting tools are hereby incorporated by reference as if set forth in their entirety herein: U.S. Pat. No. 6,116,825, having attorney docket no. NHL-KEH-05 US, issued to Kammermeier et al. on Sep. 12, 2000; U.S. Pat. No. 6,210,083, having attorney docket no. NHL-KEH-05-C US, issued to Kammermeier et al. on Apr. 3, 2001; U.S. Pat. No. 6,231,276, having attorney docket no. NHL-KEH-09 US, issued to Muller et al. on May 15, 2001.

The following U.S. patent applications regarding cutting tools and/or inserts for cutting tools are hereby incorporated by reference as if set forth in their entirety herein: Ser. No. 09/521,134, having attorney docket no. NHL-KEH-13 US, having inventors Gebhard MÜLLER and Horst JAGER, filed on Mar. 8, 2000; Ser. No. 09/927,921, having attorney docket no. NHL-KEH-14 US, having inventors Bernhard Walter BORSCHERT, Jochen STIES, Dieter Hermann M ÜHLFRIEDEL, and Karl-Heinz WENDT, filed on Aug. 10, 2001; Ser. No. 09/966,735, having attorney docket no. NHL-KEH-16 US, having inventor Ulrich KRENZER, filed on Sep. 28, 2001; and Ser. No.10/061,448, having attorney docket no. NHL-KEH-18 US, having inventor Ulrich KRENZER, filed on Feb. 1, 2002.

Some examples of cutting inserts, features of which may be utilized or adapted for use in at least one possible embodiment of the present invention may be found in the following U.S. patents: U.S. Pat. No. 6,170,917, issued to Heinrich et al. on Jan. 9, 2001; U.S. Pat. No. 6,161,990, issued to Oles et al. on Dec. 19, 2000; U.S. Pat. No. 6,123,488, issued to Kasperik et al. on Sep. 26, 2000; U.S. Pat. No. 6,050,752, issued to DeRoche on Apr. 18, 2000; U.S. Pat. No. 6,010,283, issued to Heinrich et al. on Jan. 4, 2000; U.S. Pat. No. 5,976,707, issued to Grab on Nov. 2, 1999; U.S. Pat. No. 5,788,427, issued to Zitzlaff et al. on Aug. 4, 1998; U.S. Pat. No. 5,188,489, issued to Santhanam et al. on Feb. 23, 1993; U.S. Pat. No. 4,685,844, issued to McCreery et al. on Aug. 11, 1987; U.S. Pat. No. 4,447,175, issued to Warren on May 8, 1984; U.S. Pat. No. 4,360,297, issued to Weber on Nov. 23, 1982; and U.S. Pat. No. 4,140,431, issued to Friedline et al. on Feb. 20, 1979.

Some examples of cutting tools and/or other cutting inserts, features of which may be utilized or adapted for use in at least one possible embodiment of the present invention may be found in the following U.S. patents: U.S. Pat. No. 6,293,739, issued to Uchino et al. on Sep. 25, 2001; U.S. Pat. No. 6,293,737, issued to Satran et al. on Sep. 25, 2001; U.S. Pat. No. 6,284,366, issued to König et al. on Sep. 4, 2001; U.S. Pat. No. 6,254,658, issued to Taniuchi et al. on Jul. 3, 2001; U.S. Pat. No. 6,238,148, issued to Taniuchi et al. on May 29, 2001; U.S. Pat. No. 6,213,692, issued to Guehring et al. on Apr. 10, 2001; U.S. Pat. No. 6,180,266, issued to Amano et al. on Jan. 30, 2001; and U.S. Pat. No. 6,120,220, issued to Speare on Sep. 19, 2000.

Some further examples of cutting tools and/or cutting inserts, features of which may be utilized or adapted for use in at least one possible embodiment of the present invention may be found in the following U.S. patents: U.S. Pat. No. 6,079, 913, issued to König et al. on Jun. 27, 2000; U.S. Pat. No. 5,915,162, issued to Uchino et al. on Jun. 22, 1999; U.S. Pat. No. 5,890,847, issued to Uesaka et al. on Apr. 6, 1999; U.S. Pat. No. 5,868,530, issued to Shouse on Feb. 9, 1999; U.S. Pat. No. 5,771,763, issued to Naslund et al. on Jun. 30, 1998; U.S. Pat. No. 5,755,815, issued to Kochanek on May 26, 1998; U.S. Pat. No. 5,705,263, issued to Lenander et al. on Jan. 6, 1998; and U.S. Pat. No. 5,702,210, issued to Boianjiu on Dec. 30, 1997.

The invention as described hereinabove in the context of the preferred embodiments is not to be taken as limited to all of the provided details thereof, since modifications and variations thereof may be made without departing from the spirit and scope of the invention.

| LIST OF REFERENCE NUMBERS | |
|---|---|
| 1 | Cover surface |
| 2 | Cutting tip |
| 3 | Major cutting edge |
| 4 | Chip flute |
| 5 | Flank |
| 6 | Minor cutting edge |
| 7 | Cutting-edge-side longitude side |
| 8 | Major axis |
| 9 | Acute angle |
| 10 | Minor axis |
| 11 | Facing side |
| 12 | Side facing away |
| 13 | Longitudinal side farther from the cutting edge |
| 14 | Chip flute |
| 15 | Narrow side |
| 16 | Narrow side |
| 17 | Gusset |
| 117 | Chip |
| 18 | Chip |
| 20 | Central flute |
| 21 | Minor axis |
| 22 | Cutting tip angle |
| 23 | Support element |
| 24 | Chip flute |
| 25 | Through hole |
| 34 | Chip flute |
| 39 | Acute angle |

What is claimed is:

1. An indexable cutting insert for machining metal workpieces, said cutting insert comprising:

a cover face;

at least one flank being disposed transverse to said cover face;

at least one cutting edge being disposed at the transition between said cover face and said at least one flank;

said at least one cutting edge being configured to cut a metal workpiece during machining;

at least one chip flute being disposed on said cover face and to extend along and adjacent to said at least one cutting edge, and being configured to shape and guide a chip produced by the cutting of the metal workpiece with said at least one cutting edge;

said at least one chip flute comprising an oval depression in said cover face;

said at least one chip flute having an oval perimeter edge;

said oval perimeter edge comprising a smooth curve without any abrupt changes in curvature;

said cover face defining a plane;

said at least one chip flute defining a central longitudinal plane perpendicular to said cover face plane which essentially bisects said chip flute;

the surface of said chip flute having a deepest point, at which point the distance in depth from said plane defined by said cover face is greatest; and said deepest point being disposed offset and away a distance from a geometric center point of the surface of said chip flute, and being disposed offset and away a distance from said central longitudinal plane, wherein the slope of the surface extending from a section of the perimeter edge nearest the deepest point to the deepest point is greater than the slope of the surface extending from a section of the perimeter edge farther away from the deepest point to the deepest point.

2. The cutting insert according to claim 1, wherein said oval perimeter edge comprises an asymmetrical oval perimeter edge.

3. The cutting insert as claimed in claim 2, wherein: the intersection of said central longitudinal plane and said cover face plane define a longitudinal axis; and said longitudinal axis is disposed at an acute angle with respect to said at least one cutting edge, said acute angle being from 1° to 20°.

4. The cutting insert as claimed in claim 3, wherein:

said perimeter edge is disposed completely in said cover face and a distance away from said at least one cutting edge;

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge; and said cutting insert comprises a central chip flute disposed between said cutting tip and said at least one chip flute.

5. The cutting insert as claimed in claim 3, wherein:

said at least one chip flute comprises a longitudinal side disposed adjacent said at least one cutting edge;

a middle portion of said longitudinal side is disposed in said at least one flank at said at least one cutting edge;

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge; and said cutting insert comprises a central chip flute disposed between said cutting tip and said at least one chip flute.

6. The cutting insert as claimed in claim 3, wherein:

said at least one chip flute comprises a longitudinal side disposed in said at least one flank at said at least one cutting edge;

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge; and said cutting insert comprises a central chip flute disposed between said cutting tip and said at least one chip flute.

7. An indexable cutting insert for machining metal workpieces, said cutting insert comprising:

a cover face;

at least one flank being disposed transverse to said cover face;

at least one cutting edge being disposed at the transition between said cover face and said at least one flank;

said at least one cutting edge being configured to cut a metal workpiece during machining;

a plurality of chip flutes being configured to shape and guide a chip produced by the cutting of the metal workpiece with said at least one cutting edge;

each of said chip flutes comprising an ellipsoid-shaped depression in said cover face;

each of said chip flutes comprising two curved longitudinal perimeter edges disposed on opposite sides of said depression;

said chip flutes being disposed adjacent to one another in a line on said cover face, wherein the longitudinal perimeter edges of each pair of adjacent chip flutes merge together and form an obtuse angle and thus a ridge is formed at the intersection of each pair of adjacent chip flutes;

said chip flutes being disposed to extend along and adjacent to said at least one cutting edge;

said cover face defining a plane;

each of said chip flutes defining a central longitudinal plane perpendicular to said cover face plane which essentially bisects each of said chip flutes;

the surface of each of said chip flutes having a deepest point, at which point the distance in depth from said plane defined by said cover face is greatest; and said deepest point being disposed offset and away a distance from a geometric center point of the surface of each of said chip flutes, and being disposed offset and away a distance from said central longitudinal plane, wherein the slope of the surface extending from a section of the perimeter edge nearest the deepest point to the deepest point is greater than the slope of the surface extending from a section of the perimeter edge farther away from the deepest point to the deepest point.

8. The cutting insert according to claim 7, wherein:

the intersection of said central longitudinal plane and said cover face plane define a longitudinal axis; and said longitudinal axis is disposed at an acute angle with respect to said at least one cutting edge, said acute angle being from 1° to 20°.

9. The cutting insert according to claim 8, wherein:

said merged longitudinal perimeter edges of said plurality of chip flutes are disposed to form two side edges disposed on opposite sides of said plurality of chip flutes; and each of said side edges having a scalloped shape, wherein adjacent curved portions meet at a point and abruptly change curvature at said point.

10. The cutting insert according to claim 9, including one of (A), (B), and (C), wherein (A), (B), and (C) are:

(A) said perimeter edge of each of said chip flutes is disposed completely in said cover face and a distance away from said at least one cutting edge;

(B) each of said chip flutes comprises a longitudinal side disposed adjacent said at least one cutting edge; and a middle portion of said longitudinal side is disposed in said at least one flank at said at least one cutting edge; and (C) said at least one chip flute comprises a longitudinal side disposed in said at least one flank at said at least one cutting edge.

11. The cutting insert according to claim 10, wherein:

each of said chip flutes are of approximately equal size;

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge; and said cutting insert comprises a central chip flute disposed between said cutting tip and said at least one chip flute.

12. The cutting insert according to claim 11, wherein:

said plurality of chip flutes comprises at least a first plurality of chip flutes and a second plurality of chip flutes;

said first plurality of chip flutes are merged with one another to form a first chip flute arrangement;

said second plurality of chip flutes are merged with one another to form a second chip flute arrangement; and said cutting insert comprises at least one support element disposed on an inner area of said cutting insert between said first and second chip flute arrangements, which at least one support element projects above said cover face.

13. The cutting insert according to claim 10, wherein:

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge;

said cutting insert comprises a central chip flute disposed between said cutting tip and said at least one chip flute; and each of said chip flutes increases in size as the distance from said cutting tip increases.

14. The cutting insert according to claim 13, wherein:

said plurality of chip flutes comprises at least a first plurality of chip flutes and a second plurality of chip flutes;

said first plurality of chip flutes are merged with one another to form a first chip flute arrangement;

said second plurality of chip flutes are merged with one another to form a second chip flute arrangement; and said cutting insert comprises at least one support element disposed on an inner area of said cutting insert between said first and second chip flute arrangements, which at least one support element projects above said cover face.

15. An indexable cutting insert for machining metal workpieces, said cutting insert comprising:

a cover face;

at least one flank being disposed transverse to said cover face;

at least one cutting edge being disposed at the transition between said cover face and said at least one flank;

said at least one cutting edge being configured to cut a metal workpiece during machining;

at least one chip flute being disposed on said cover face and to extend along and adjacent to said at least one cutting edge, and being configured to shape and guide a chip produced by the cutting of the metal workpiece with said at least one cutting edge;

said at least one chip flute comprising an ellipsoid-shaped depression in said cover face;

said at least one chip flute having an elliptical perimeter edge;

said elliptical perimeter edge comprising a curve without any abrupt changes in curvature;

said cover face defining a plane;

said at least one chip flute defining a central longitudinal plane perpendicular to said cover face plane which essentially bisects said chip flute;

the surface of said chip flute having a deepest point, at which point the distance in depth from said plane defined by said cover face is greatest; and said deepest point being disposed offset and away a distance from a geometric center point of the surface of said chip flute, and being disposed offset and away a distance from said central longitudinal plane, wherein the slope of the surface extending from a section of the perimeter edge nearest the deepest point to the deepest point is greater than the slope of the surface extending from a section of the perimeter edge farther away from the deepest point to the deepest point.

16. The cutting insert according to claim 15, wherein said elliptical perimeter edge comprises an asymmetrical elliptical perimeter edge.

17. The cutting insert as claimed in claim 16, wherein:

the intersection of said central longitudinal plane and said cover face plane define a longitudinal axis; and said longitudinal axis is disposed at an acute angle with respect to said at least one cutting edge, said acute angle being from 1°to 20°.

18. The cutting insert as claimed in claim 17, wherein:

said perimeter edge is disposed completely in said cover face and a distance away from said at least one cutting edge;

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge; and said cutting insert comprises a central chip flute disposed between said cutting tip and said at least one chip flute.

19. The cutting insert as claimed in claim 17, wherein:

said at least one chip flute comprises a longitudinal side disposed adjacent said at least one cutting edge;

a middle portion of said longitudinal side is disposed in said at least one flank at said at least one cutting edge;

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge; and said cutting insert comprises a central chip flute disposed between said cutting tip and said at least one chip flute.

20. The cutting insert as claimed in claim 17, wherein:

said et least one chip flute comprises a longitudinal side disposed in said at least one flank at said at least one cutting edge;

said at least one cutting edge comprises at least two cutting edges;

said at least two cutting edges comprise a first cutting edge and a second cutting edge disposed transverse to said first cutting edge;

said cutting insert comprises a cutting tip disposed to connect said first cutting edge and said second cutting edge; and said cutting insert comprises a central chip flute disposed between said cutting tip and said at least one chip flute.

* * * * *

UNITED STATES PATENT AND TRADEMARK OFFICE

CERTIFICATE OF CORRECTION

PATENT NO. : 6,676,339 B2 
DATED : January 13, 2004
INVENTOR(S) : Rudi Hartlöhner It is certified that error appears in the above-identified patent and that said Letters Patent is hereby corrected as shown below:

Column 12,
Line 67, after "to", delete "Muller" and insert -- Müller --.

Column 13,
Line 8, after "Hermann" delete "M".
Line 9, before "and", delete "ÜHLFRIEDEL," and insert -- MÜHLFRIEDEL, --.
Line 57, after "to", delete "Naslund" and insert -- Näslund --.

Column 18,
Line 53, after "said", delete "et" and insert -- at --.

Signed and Sealed this

Twenty-second Day of June, 2004

JON W. DUDAS
*Acting Director of the United States Patent and Trademark Office*